United States Patent
Maeda et al.

(10) Patent No.: US 7,044,255 B2
(45) Date of Patent: May 16, 2006

(54) ELECTRIC GENERATING SYSTEM FOR AUTOMOBILES AND ITS CONTROL METHOD

(75) Inventors: Yuuji Maeda, Hitachiota (JP); Keiichi Mashino, Hitachinaka (JP); Hisaya Shimizu, Hitachinaka (JP); Tatsuyuki Yamamoto, Isehara (JP); Yoshinori Fukasaku, Hitachinaka (JP); Susumu Tajima, Hitachinaka (JP); Toshiyuki Innami, Tsuchiura (JP); Keisuke Mishidate, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 09/736,417

(22) Filed: Dec. 15, 2000

(65) Prior Publication Data

US 2001/0042649 A1 Nov. 22, 2001

(30) Foreign Application Priority Data

| Dec. 15, 1999 | (JP) | ............................................. 11-356033 |
| Mar. 1, 2000 | (JP) | ...................................... 2000-055371 |
| Mar. 17, 2000 | (JP) | ...................................... 2000-081719 |

(51) Int. Cl.
*B60K 17/356* (2006.01)

(52) U.S. Cl. ......................... 180/242; 180/243; 180/65.2
(58) Field of Classification Search ................. 180/65.2, 180/65.3, 65.4
See application file for complete search history.

(56) References Cited

U.S. PATENT DOCUMENTS

| 3,591,847 A | * | 7/1971 | Donnell et al. ................. 307/37 |
| 4,109,743 A | * | 8/1978 | Brusaglino et al. ......... 180/65.4 |
| 4,180,138 A | * | 12/1979 | Shea .......................... 180/65.2 |
| 4,407,132 A | * | 10/1983 | Kawakatsu et al. ............ 60/716 |
| 4,491,779 A | * | 1/1985 | Campbell et al. ............ 320/123 |
| 4,923,025 A | | 5/1990 | Ellers |
| 4,953,646 A | | 9/1990 | Kim ........................... 180/65.4 |
| 5,081,365 A | * | 1/1992 | Field et al. ..................... 290/45 |
| 5,097,165 A | * | 3/1992 | Mashino et al. ............ 310/112 |
| 5,343,970 A | * | 9/1994 | Severinsky ................. 180/65.2 |
| 5,351,775 A | * | 10/1994 | Johnston et al. ........... 180/65.2 |
| 5,495,906 A | | 3/1996 | Furutani |
| 5,635,805 A | | 6/1997 | Ibaraki et al. |
| 5,689,174 A | | 11/1997 | Pacheco, Sr. ................. 322/16 |
| 5,698,905 A | * | 12/1997 | Ruthlein et al. ............... 290/32 |
| 5,848,659 A | * | 12/1998 | Karg et al. ................. 180/65.4 |
| 6,059,064 A | * | 5/2000 | Nagano et al. .............. 180/243 |
| 6,209,672 B1 | * | 4/2001 | Severinsky ................. 180/65.2 |
| 6,481,516 B1 | * | 11/2002 | Field et al. ................. 180/65.2 |
| 6,493,618 B1 | * | 12/2002 | Nada ........................... 701/34 |

FOREIGN PATENT DOCUMENTS

| EP | 0911941 | 4/1999 |
| JP | 53-55105 | 10/1951 |
| JP | 55-127624 | 3/1954 |
| JP | 53-55105 | 5/1978 |
| JP | 55-110328 | 8/1980 |
| JP | 55-127624 | 9/1980 |
| JP | 7-231508 | 8/1995 |
| JP | 8-79915 | 3/1996 |
| JP | 10-174201 | 6/1998 |

* cited by examiner

*Primary Examiner*—Christopher P. Ellis
*Assistant Examiner*—Bridget Avery
(74) *Attorney, Agent, or Firm*—Crowell & Moring LLP

(57) ABSTRACT

An electric generating system for automobiles has a primary generator which is driven by an internal combustion engine of an automobile and supplies power to an electric load of the automobile and an electric motor for driving wheels of the automobile which are not driven by the internal combustion engine. A secondary generator is driven by the internal combustion engine and drives the motor. A control unit controls the secondary generator and the electric motor. The control circuit controls the output of the generator according to a driving force requested by the automobile, and the driving force of the electric motor is controlled by the output of the secondary generator.

41 Claims, 17 Drawing Sheets

ELECTRIC GENERATING SYSTEM FOR AUTOMOBILES AND ITS CONTROL METHOD

DETAILED DESCRIPTION OF THE INVENTION

BACKGROUND OF THE INVENTION

1. Field of the Invention

The present invention relates to an electric generating system for automobiles and its control method, more particularly to an electric generator fit for a 4-wheel drive automobile which electrically drives wheels which are not driven directly by the internal combustion engine.

2. Related Background Art

As a conventional art of means which drives wheels which are not driven directly by the internal combustion engine, Japanese Non-examined Patent Publications H07-151514 (1995) discloses a means which runs an electric motor by a combination of a 14-V alternator and a 12-V battery for an auxiliary unit only on a low μ road which requires a starting assistant. Japanese Non-examined Patent Publications H07-231508 (1995) discloses a system which drives an electric motor by a combination of a 14-V alternator and a 12-V battery for auxiliary units.

Further Japanese Non-examined Utility Model Publications S55-110328 (1980) discloses a 4-wheel drive automobile which drives four wheels only when the running vehicle slips. In other words, this publication discloses an automobile driving either front wheels or rear wheels by a power of the engine, wherein said automobile comprises an auxiliary driving source (an electric motor and a generator) which drives the rear or front wheels which are not driven directly by the engine and a controller which detects a difference between front wheel revolutions and rear wheel revolutions and controls said auxiliary driving source.

In a low-voltage power generating system having a 14-V generator and a 12-V battery for an auxiliary unit, a large current is required to cause the electric motor to output enough power to get the full performance of the 4-wheel drive automobile. In other words, such a low-voltage power generating system requires a large current because a control voltage is low. Consequently, system components such as switches, electric circuits, and harnesses are required to withstand large currents. This necessarily increases production cost and component sizes.

Contrarily, if a driving torque is set low, the system cannot fully assist the 4-wheel drive automobile. Further, this low-voltage and large-current power applied to the whole electric circuit generates heat and reduces the efficiency.

Furthermore, as the size of the 12-V battery (for normal automobile electric loads) is limited, the electric energy output from the battery is low and the service life of the battery for the 4-wheel drive automobile becomes much limited. Therefore, this battery is not enough to go up a long continuous slope which requires high power for a long time.

If one generator is used both to charge the battery for the auxiliary unit and to drive the electric motor, various problems occur such as cost increase due to provision of the change-over switch, requirement of reliability, reduction in efficiency because different required output characteristics must be satisfied, increase of electric losses caused by said large current, and reduction of available energy.

If a driving circuit contains a voltage source such as a battery, its voltage value is automatically set by the characteristics of the voltage source and an optimum voltage required by the motor cannot be supplied.

Further, the system disclosed by Japanese Non-examined Utility Model Publications S55-110328 (1980) always makes a difference between front and rear wheel revolutions. This difference is dependent upon the "μ" value of the running road. Therefore, this system controls the output of the generator of the auxiliary driving source so as to follow the revolutions of the wheels driven by the engine. This system causes the automobile to work as a 4-wheel drive automobile only when the automobile slips, but usually, this system leaves the automobile as a 2-wheel drive automobile.

SUMMARY OF THE INVENTION

An object of the present invention is to provide an electric generating system for automobiles and a method thereof which can give a sufficient 4-wheel drive performance to an automobile driven by an electric motor.

Another object of the present invention is to provide an electric generating system for automobiles and a method thereof which enables inexpensive, high-efficient and high 4-wheel drive performance.

It is an object of the present invention to provide an electric generating system for automobiles comprising a primary generator which is driven by an internal combustion engine of an automobile and supplies power to an electric load of the automobile and an electric motor for driving wheels of said automobile which are not driven by said internal combustion engine, further comprising a secondary generator which is driven by said internal combustion engine and a control unit which controls said secondary generator and said electric motor;

wherein said control circuit controls the output of said generator according to a driving force requested by said automobile and the driving force of said electric motor is controlled by the output of said secondary generator.

It is another object of the present invention to provide an electric generating system for automobiles comprising a primary generator which is driven by an internal combustion engine of an automobile and supplies power to a low-voltage electric load of the automobile and an electric motor for driving wheels of said automobile which are not driven by said internal combustion engine further comprises a secondary generator which is driven by said internal combustion engine and a control unit which controls said secondary generator and said electric motor;

wherein said secondary generator is constituted to output a variable-voltage power of a lower voltage to a higher voltage than the power for said low-voltage system and said control unit controls the output of said secondary generator according to the requested driving force of said automobile to adjust the driving force of said electric motor by a voltage or current supplied from said secondary generator.

It is a further object of the present invention to provide said electric generating system for automobiles wherein the field winding of said secondary generator has two power sources and the voltage output from said secondary generator to said electric motor can be switched in a plurality of steps or in a preset voltage area.

It is a furthermore object of the present invention to provide an electric generating system for automobiles comprising a primary generator which is driven by an internal combustion engine of an automobile and supplies power to an electric load of the automobile and an electric motor for driving wheels of said automobile which are not driven by said internal combustion engine further comprises a secondary generator which is driven by said internal combustion engine and a control unit which controls said secondary generator and said electric motor;

wherein said secondary generator is constituted to output a power to said electric motor and said control unit contains an external control unit except for a control unit of said secondary generator, and causes said external control unit to output a field current on/off signal as a command to control said secondary generator, and thus sets an arbitrary output voltage or current of said secondary generator.

In accordance with the present invention, a sufficient driving force can be obtained by controlling the driving force of an electric motor for driving wheels by the output of a dedicated generator or a secondary generator. In other words, the present invention can provide an electric generating system for automobiles and a method thereof which can assure a sufficient 4-wheel driving performance (standing comparison with mechanical 4-wheel drive systems) in a wide range from automobile start-up to climbing up a steep slope at a high speed.

The electric generating system for automobiles and a method thereof in accordance with the present invention also have original 4-wheel drive merits (such as no propeller shaft, flat vehicle floor) and require no high-voltage battery. This can reduce the production cost of the automobile, place the generator anywhere in the automobile, and eliminate maintenance and replacement of a high-voltage battery. Therefore the driving system can be simple, high efficient, and with high performance.

DETAILED DESCRIPTION OF PREFERRED EMBODIMENTS

Figure 1:
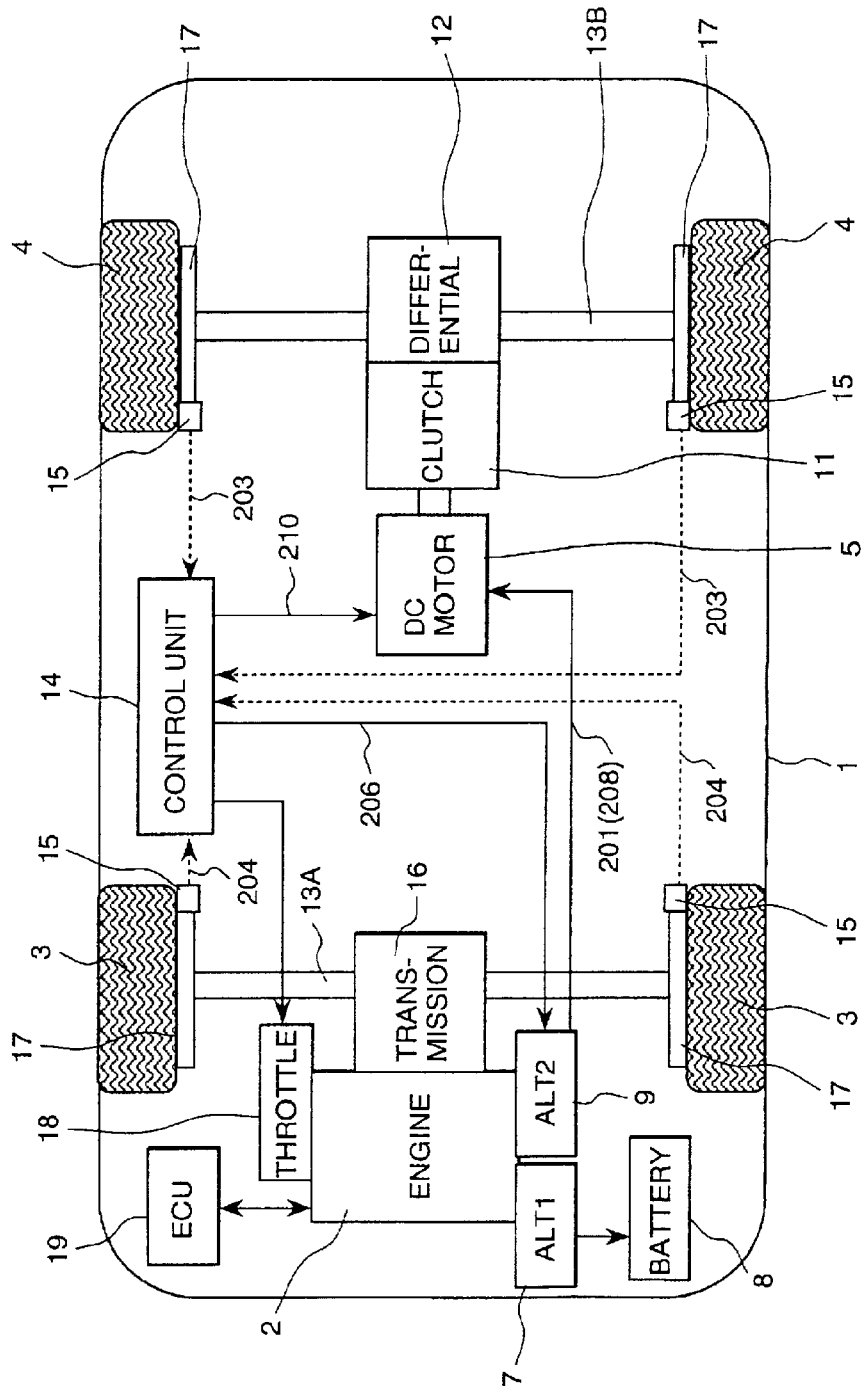
FIG. 1 is a block diagram of the whole driving system of the 4-wheel drive automobile in accordance with the present invention.
Figure 2:
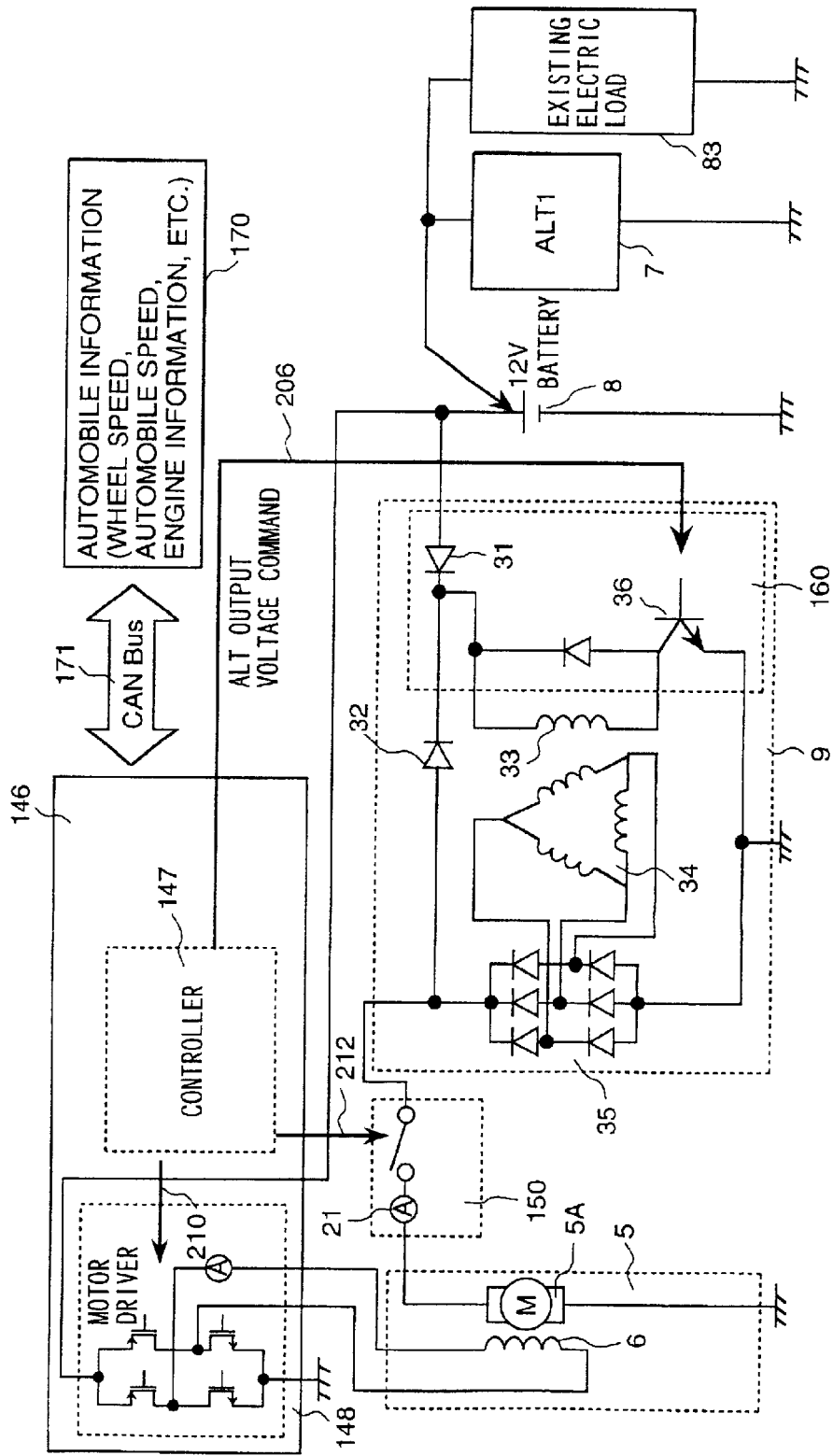
FIG. 2 is a block diagram of the whole electric generating system for automobiles of FIG. 1.

Below will be explained some embodiments having an electric generating system for automobiles in accordance with the present invention installed in a driving system of a 4-wheel drive automobile, referring to accompanying drawings. FIG. 1 is a block diagram of the whole driving system of the 4-wheel drive automobile in accordance with the present invention. FIG. 2 is a block diagram of the whole electric generating system for automobiles of FIG. 1.

The front wheels 3 of the 4-wheel drive automobile are driven by the engine 2 and the rear wheels are driven by the d.c. motor 5. The engine 2 is controlled by the engine control unit (ECU) 19. The output of the engine 2 is transmitted to the front wheels through the transmission 16 and the drive shaft 13A. The engine room contains a primary generator 7 for an auxiliary unit which supplies power to a normal electric load of the automobile. The primary generator 7 is driven by the engine 2 via a belt and stores part of its output in the battery for auxiliary units 8.

This embodiment has a high-output generator (or a secondary generator) which is belt-driven by the engine 2 near the primary generator in the engine room. The secondary generator 9 is connected to the d.c. motor for driving the read wheels. The d.c. motor 5 is connected to the drive shaft 13B of the rear wheels 4 through the differential gear 12 and the clutch 11. When the differential gear 12 is coupled with the clutch 11, the output shaft of the d.c. motor 5 is connected to the differential gear 12 by means of the clutch 11. When the clutch 11 disconnects, the d.c. motor 5 is disengaged from the rear wheels.

The control unit 14 collectively controls the rotary electric units of the a-wheel drive automobile (the d,c, motor 5, the primary generator 7, and the secondary generator 9). Each of the front wheels 3 and the rear wheels 4 has a wheel sensor 15 which detects the rate and direction of its revolutions. In this embodiment, the control unit 14 is provided outside the d.c. motor 5 and the secondary generator 9.

This control unit 14 and the regulators which are provided in the d.c. motor 5 and the secondary generator constitute a control system of the whole generator for the automobile.

The control unit 14 receives signals 203 and 204 from wheel sensors 15 and outputs control commands 210 and 201 (or 208) to the d.c. motor 5 and the secondary generator 9. Controlling of the control unit 14 over the primary generator is not explained here.

The primary generator 7 for the auxiliary units is a general-purpose generator of, for example, about 12 V and 2 KW. Meanwhile, the secondary generator 9 is a generator of, for example, about 36 V and 6 KW, outputting higher power than the primary generator 7.

The d.c. motor 5 is preferably a d.c. shunt generator which can easily switch between CW and CCW or a separately-excited d.c. motor. The present invention is also applicable to vehicles having six wheels or more such as trucks and vehicles such as trailers whose wheels are independently driven by motors.

The control unit 14 comprises a processing unit 144 having a microcomputer which inputs and processes sensor signals and a driver unit which drives the field current of the d.c. motor 5 and the field current of the secondary generator. Further, the control unit 14 receives signals from the engine revolution sensor 23, the gear position sensor 24, the velocity sensor 15, the accelerator opening sensor 25, and the wheel sensors 15 and controls the field current of the secondary generator and the field current of the d.c. motor 5 according to the running status of the automobile. The d.c. motor can be substituted by an a.c. motor if necessary.

The control unit 14 can be constituted as a unit which collectively controls the whole automobile including the generator and the ECU 19. In this case, the control unit 14 outputs control commands to control the throttle valves of the engine and control commands for the clutch 11 which disconnects the d.c. motor 5 from the differential gear 12. The description below assumes that the control unit 14 mainly controls the generator.

The brake 17 mounted on each of the front and rear wheels 3 and 4 has an anti-lock brake (ABS) actuator which is controlled by an anti-lock brake (ABS) control unit (not shown in the drawings). The detailed explanation of the anti-lock brake (ABS) control unit is omitted here assuming that this embodiment employs publicly-known anti-lock brake (ABS) control unit.

The output of the engine 2 is controlled by an electronically-controlled throttle valve 18 which is driven by commands from the engine control unit (ECU) 19. The electronically-controlled throttle valve 18 has an accelerator opening sensor to detect the opening of the accelerator. If the electronically-controlled throttle valve 18 is substituted by a mechanical link of an accelerator pedal and a throttle valve, the accelerator opening sensor can be mounted on the accelerator pedal. The engine control unit (ECU) 19 control the transmission 16 (which is an automatic transmission) to have a gear ratio selected by a selection lever. The selected position is detected by a gear position detecting sensor. The transmission can be a manual transmission.

FIG. 2 shows a detailed configuration of the electric generating system for automobiles, more particularly the control unit 14 of the generator. This electric generating system for automobiles contains the battery 8, the d.c. motor 5, the primary generator 7, the secondary generator, and the controller 146 which is a driver thereof. The controller 146 to perform various processing and computation contains an I/O circuit, an A/D converter, a central processing unit (CPU) 147 for computation and processing, and a motor driver 148. Further, the controller 146 has memory to store programs and data to control the electric motor. The controller 146 calculates the velocity of the automobile from the entered information, calculates the output voltage of the secondary generator 9 (ALT2), and sends the result to the secondary generator 9 through the I/O circuit to control the output voltage of the secondary generator. Controlling of the primary generator 7 is omitted here assuming that the publicly-known art is employed here.

A battery 8 is a 12-V battery 8. This battery 8 and the primary generator 7 for charging the battery constitutes a low-voltage, or constant-voltage (e.g. 12 V) charging and generating system which supplies power to the existing electric load 83 of the automobile. The battery 8 supplies power to said system when the engine stops and is charged by the primary generator 7 after the engine starts. As long as the primary generator 7 is generating power, the primary generator 7 supplies power to the normal electric load of the automobile.

The field coil 33 of the secondary generator is connected to the charging generator 7 and the battery 8 which are the low-voltage current sources through a diode 31 in the regulator 160. The power induced by the stator 34 is supplied to the d.c. motor 5 through a rectifying diode 35. The outputs of the rectifying diodes 35 are connected to the field coil 33 and the battery 8 through a diode 32 provided in the secondary generator 9. In this way, the field coil 33 of the secondary generator 9 is connected to the power source through field current switching diodes 31 and 32. In other words, the field coil 33 is connected to the charging generator and the battery 8 which are the separately-excited power sources and further connected to the outputs of the rectifying diodes 35 (which are the self-excited power source).

The secondary generator 9 constitutes a (high-voltage) power generating system which supplies a variable-voltage power of a low voltage to a high voltage to the d.c. motor. The output of the secondary generator 9 is dependent upon the revolutions of the engine and a field current flowing through the field coil 33 which are linked by a driving source. A preset output voltage is obtained from the secondary generator 9 by controlling the field current by the transistor 36 of the regulator 160 according to the voltage command 203 given from the CPU 147 of the controller 146. This embodiment sets the output voltage of 50 V or less considering the high voltage leak and the heat resistance of the secondary generator 9.

The CPU 147 of the controller 146 obtains sensor signals required for controlling from the other control unit 170 in the automobile (e.g. ECU 19 or ABS control unit through the LAN (CAN) path 17 in the automobile. In other words, the CPU 147 receives information about revolutions and directions of the wheels, information about accelerator openings, and information of gear positions from the ECU or the like through the on-car LAN.

The CPU 147 of the controller 146 calculates the running status of the automobile and the required drive quantity from these pieces of information, outputs a command value 206 to generate a required output voltage to the secondary generator so that the d.c. motor 5 may get a required torque and revolutions. In this way, the CPU 147 controls the output voltage of the secondary generator 9 and consequently controls the separately-excited d.c. motor 5.

Further, the CPU 147 controls the field current flowing through the field winding 6 of the d.c motor 5. In other words, the current flowing through the field winding 6 of the d.c. motor 5 is determined by controlling the motor driver 148 connected between the battery 8 and the field winding 6 by a field command 210 coming from the CPU 147. This enables the CPU 147 to directly control the d.c. motor 6 and as the result, the reduction of a response caused by controlling the d.c. motor 5 by the output of the secondary generator will be lessened.

The input circuit for the separately-excited d.c. motor 5 is constituted by a circuit for the armature winding 5A and a circuit for the field winding 6. The circuit for the armature winding 5A is directly connected to the secondary generator through a switch 150. The field winding 6 receives power from the 12-V battery 8 over the signal line from the motor driver 148. The CPU 147 controls the current flowing through the field winding 6 of the d.c. motor 5 through the motor driver 148 to meet the characteristic requirement of the d.c. motor 5.

Further, power from a low voltage to a high voltage proportional to the revolutions of the engine is supplied from the secondary generator to the armature winding 5A of the motor 5 through a wire path and a change-over. switch 150. The part 21 is an ammeter.

When the automobile moves back, the motor driver 148 flows a field current of the opposite direction (CCW). This produces a backward driving force as strong as the forward driving force. The CPU 147 produces an intermittent clutch signal and feeds it to the clutch to through the I/O circuit.

By employing a parallel circuit as an input circuit of the d.c. motor. 5 and changing the diameters and the number of turns of the armature winding and the field winding, it is possible to increase the current fed to the armature winding of the d.c. motor 5 and to decrease the current fed to the field winding. For example, the current fed to the armature is set to a maximum of about 250 A and the current fed to the field winding is a maximum of about 20 A or more.

When the generated voltage cannot be controlled in the low-voltage system, the CPU 147 controls the current flowing through the field winding 6 of the d.c. motor to meet the characteristic requirement of the d.c. motor 5. In this case, only either the generated voltage or the field current of the motor is feedback-controlled. This is to prevent the system from being unstable. To move back the automobile, a field current of the opposite direction (CCW) is applied to revolve the d.c. motor in the reverse direction. This produces a backward driving force as strong as the forward driving force.

Figure 3:
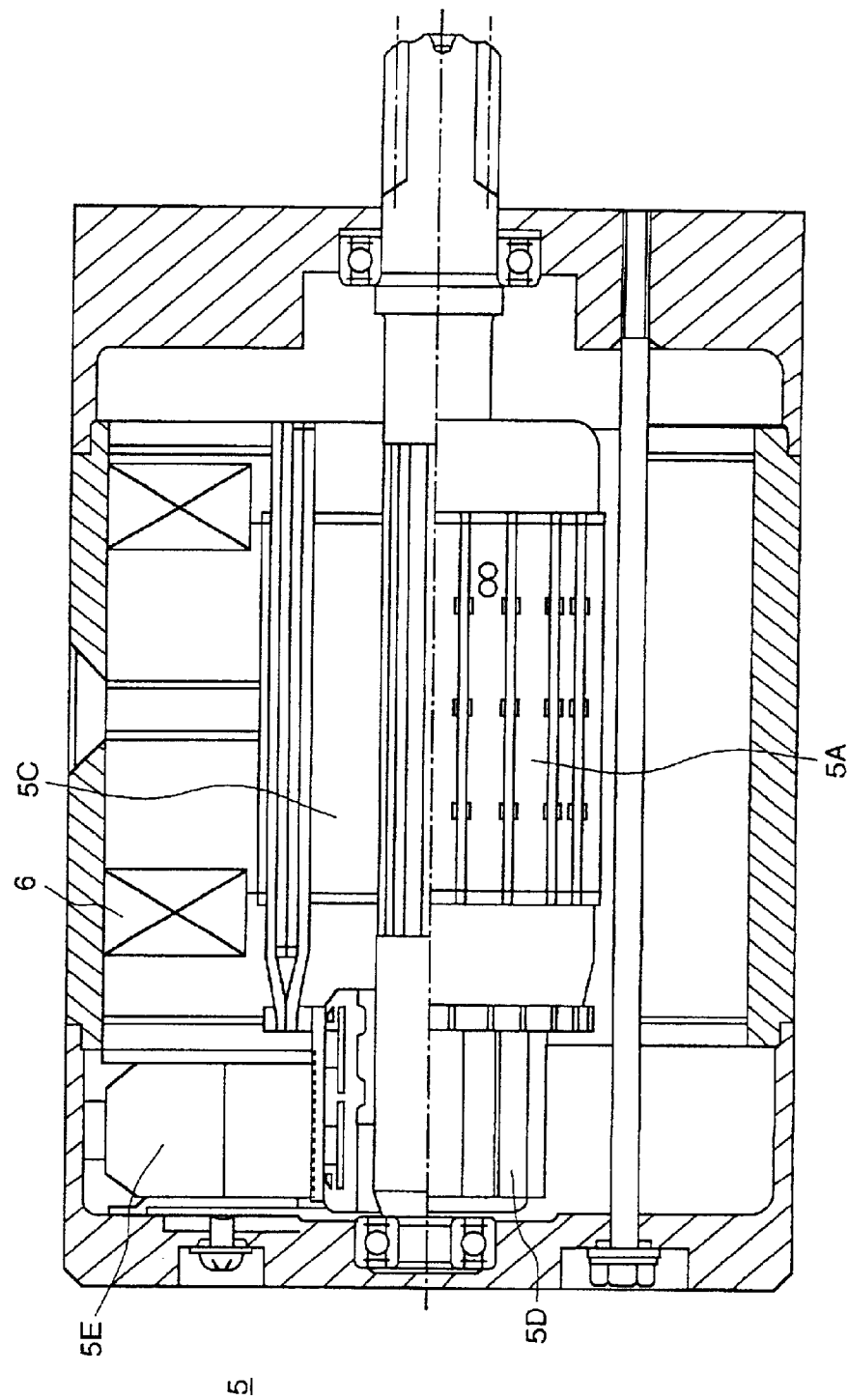
FIG. 3 is a vertical sectional view of a d.c. motor which is one embodiment of the present invention.

Below will be explained the configuration of the d.c. motor 5 referring to FIG. 3. FIG. 3 is a vertical sectional view of a d.c. motor which is one embodiment of the present invention. This motor 5 is a d.c. shunt motor. A power of 50 V from the secondary generator 9 is supplied to the armature winding 5A of the motor 5. A power of 12 V is supplied to the field winding of the motor 5. In this case, the current fed to the armature winding is made greater and the current fed to the field winding is made smaller. As a comparatively high voltage and high current power is supplied to the armature winding 5A, the number of turns of the armature winding can be reduced and consequently the core 5C of the armature (or the diameter of the core) can be smaller. Contrarily, as a comparatively low voltage and small current power is supplied to the field winding 6, the number of turns of the field winding is made greater.

In details, the armature winding 5A and the field winding 6 are supplied power from two power sources of different voltages and currents. The axial thickness (L) of the field winding 6 is made as long as possible, that is, approximately equal to the radius (½D) of the armature core 5C of the shunt motor 5 although usual electric motors meet a relationship of L<½D.

As the result, the radius of the armature core 5C and the radius of the commutator 5D become smaller, the axial length of the brush 5E can be made longer enough and thus the brush 5E can have a longer service life. Considering the space in which the motor 5 is mounted under the floor of the automobile, the outer diameter of the space for the brush 5E of the motor 5 is made approximately equal to the outer diameter of the differential gear 12 and the brush can be made fully long.

As described above, supplying different powers from two power sources to the armature winding 5A and the field winding 6B enables expansion of the length of the brush to the maximum under a condition of L<½D and the outer dimensions of the brush can be made equal to or less than that of the differential gear, for example, 200 mm or less.

Figure 4:
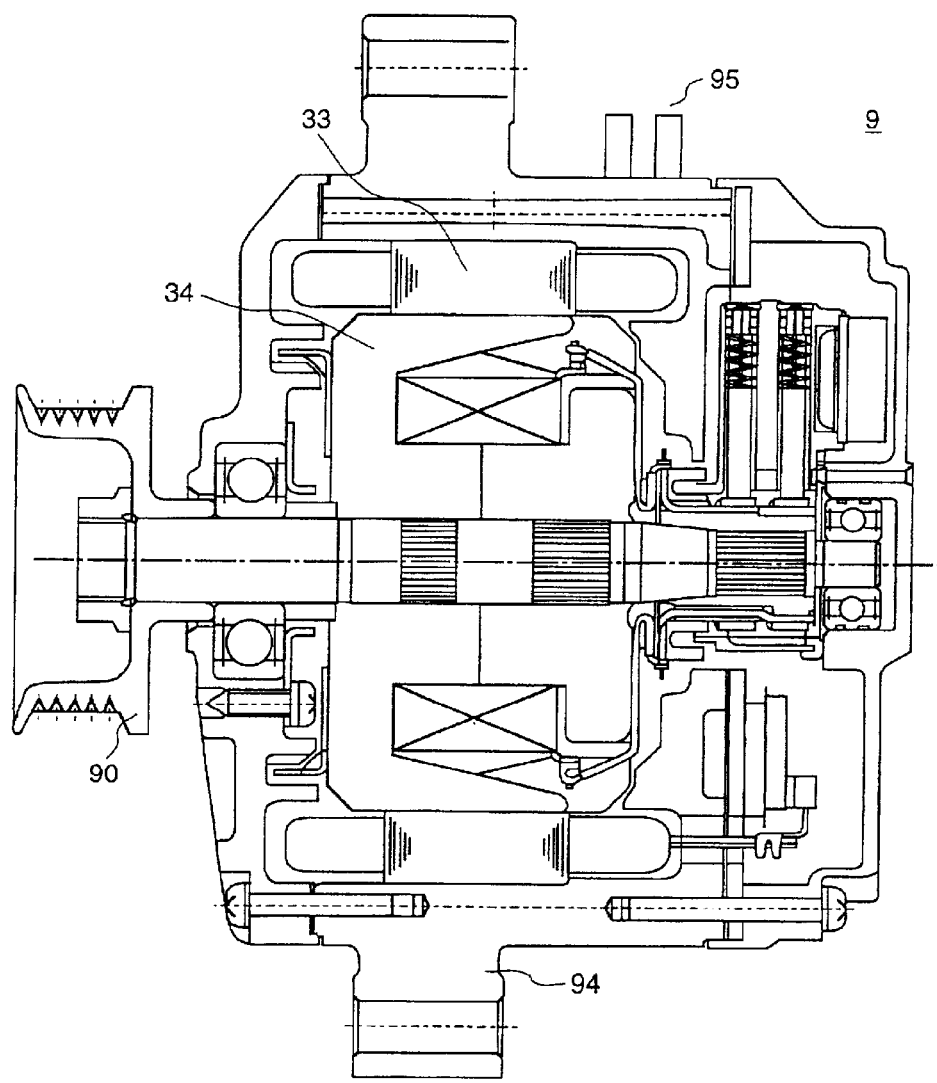
FIG. 4 is a vertical sectional view of a secondary generator which is one embodiment of the present invention.

Next, below will be explained the configuration of the secondary generator 9 used in automobiles which is one embodiment of the present invention. FIG. 4 is a vertical sectional view of the secondary generator 9.

The secondary generator 9 having a rotor 34 and a stator 35 on a bracket 94 without a ventilation window is mounted on the engine. The secondary generator receives a cooling medium from a cooling medium inlet 95A, circulates the medium adequately in the secondary generator 9 to cool the secondary generator 9, returns the medium to the engine through the medium outlet 95B to cool the medium in the radiator, then receives the cooled medium again (for re-circulation).

The secondary generator 9 as shown in FIG. 4 is installed comparatively close to the ground. As the secondary generator 9 has neither a cooling fan nor a ventilation window, no object (that may cause corrosion and problems in the secondary generator) may be taken into the secondary generator. Particularly, even when the secondary generator is covered with ice while the automobile is running, no icy water and dust would be taken into the secondary generator.

Next will be explained the computation and processing mainly made by the CPU 147 in the controller 146, referring to FIG. 5.

In the process step 144a, the CPU 147 inputs wheel speeds 203 and 204 (a total of 4 signals) from the front and rear wheels, processes as low-speed data, and obtains a vehicle velocity. In the step 144b, the CPU 147 calculates a required motor driving torque 202 from the vehicle velocity obtained in step 144a.

In the step 144c, the CPU 147 calculates a motor input voltage 206 to get a target torque 202 from the motor revolutions which are estimated from the wheel speeds. In the step 144d, the CPU 147 calculates a field current command value to request the secondary generator 9 to output this required voltage. Meanwhile, the CPU 147 takes in a voltage 201 output from the secondary generator 9 in the voltage feedback control step 144e, converts it into a current value in the step 144f, compares the resulting current value by a field current command value obtained in the step 144d, and outputs their difference as a command value 206 to the secondary generator 9.

In the step 144g, the CPU 147 calculates a field current command value 210 sent to the field block 6 of the d.c. motor 5 to request the d.c. motor 5 to output the motor input voltage which is calculated in the step 144c.

The secondary generator 9 feeds back its output voltage to get a command value 206 and outputs it as an output voltage 201 to the d.c. motor 5. In response to this voltage V, the actual torque of the d.c. motor 5 is supplied to the rear wheels 4 and the actual wheel speed 203 is obtained. This is the feedback control of the whole system.

Figure 5:
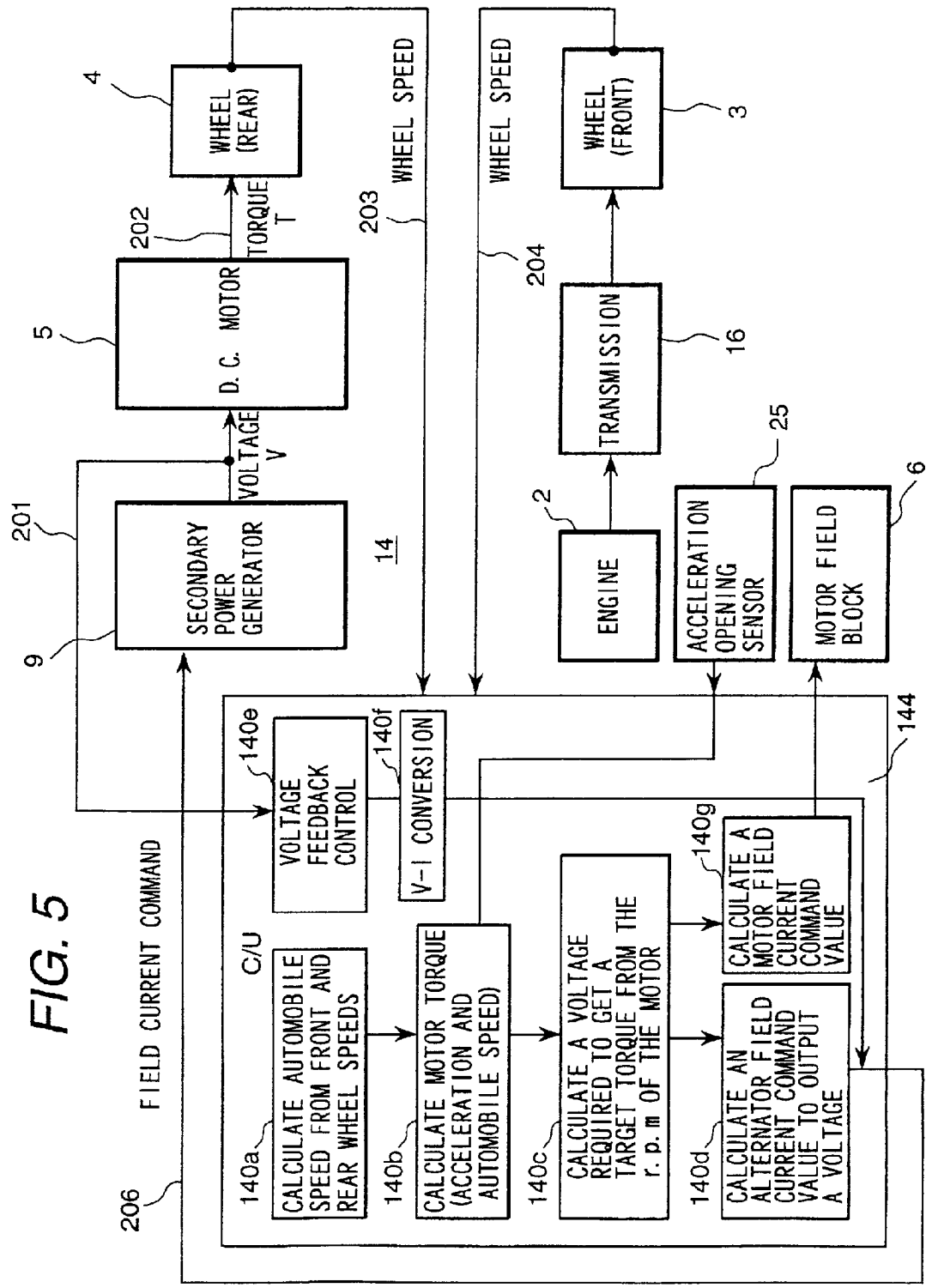
FIG. 5 is a block diagram explaining the processing which is mainly done by the CPU of the controller in one embodiment of the present invention.
Figure 6:
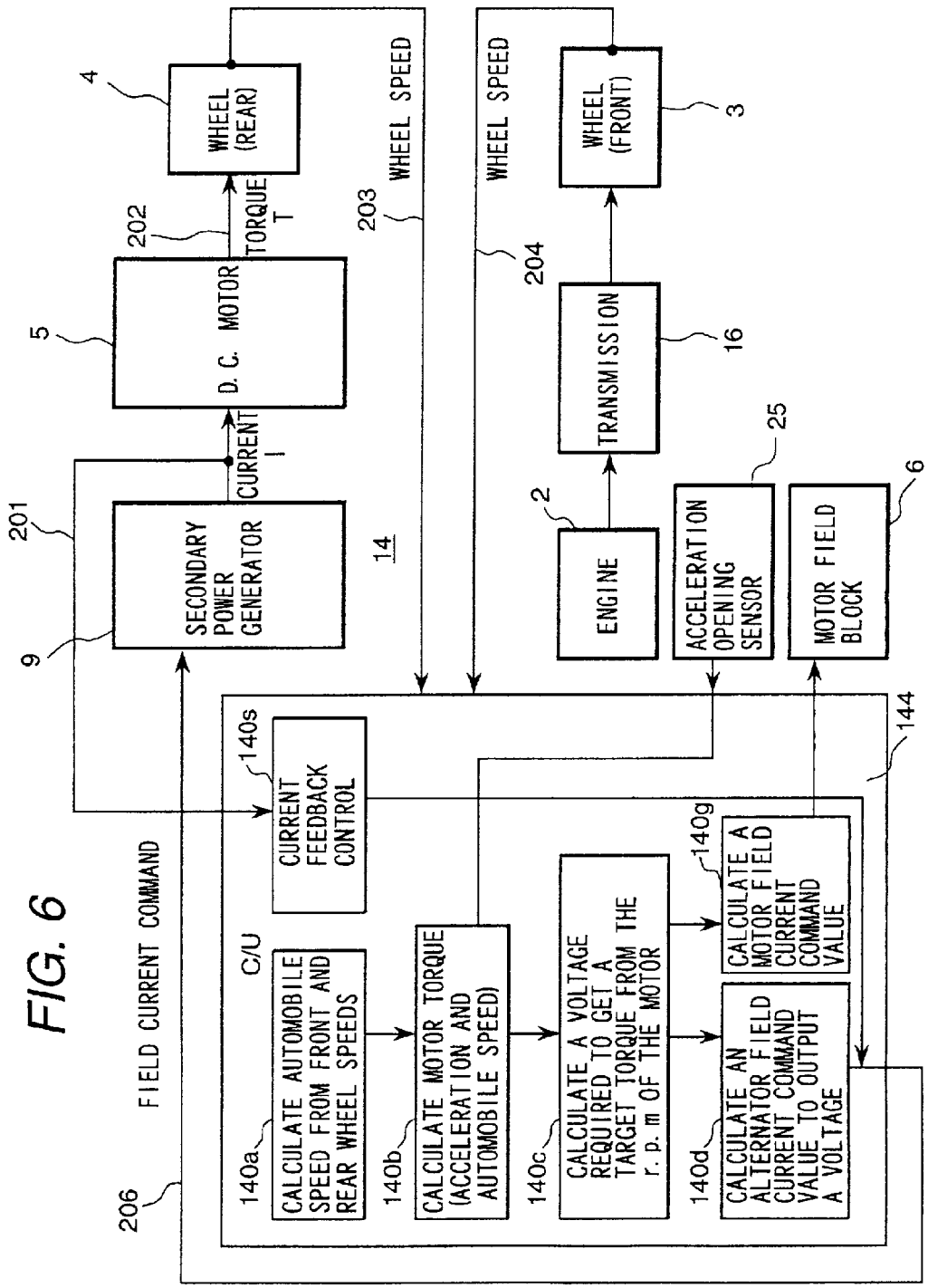
FIG. 6 is a block diagram explaining the processing which is mainly done by the CPU of the controller in another embodiment of the present invention.

The control system configuration of FIG. 5 can be substituted by a control system configuration of FIG. 6 which works in a current mode. In the system configuration of FIG. 6, the current feedback control block 144h in the controller 146 takes in a current 208 output from the secondary generator 9 and performs feedback control.

Figure 7:
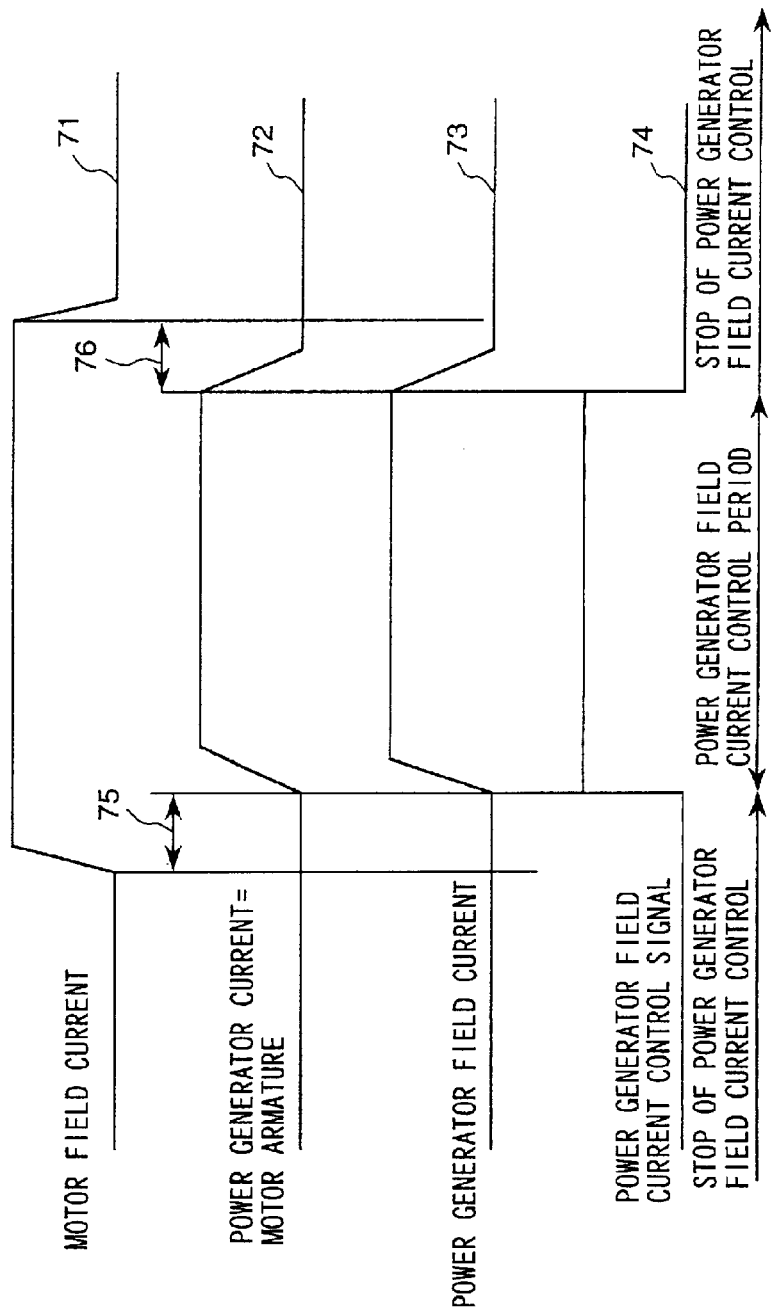
FIG. 7 shows waveforms made by the controller to start and stop the secondary generator and the d.c. motor in one embodiment of the present invention.

FIG. 7 shows waveforms made by the CPU 147 in the controller 146 to start and stop the secondary generator and the d.c. motor 5. In a preset time period 75 after a current 71 is supplied to the field winding of the shunt motor, the CPU 147 starts to supply a current 7 to the field winding of the generator and at the same time enters a signal to control the current flowing through the field winding of the generator so that the generated current 72 may flow into the armature of the motor. This preset time period 75 is longer than the response time of the motor field current but minimum. When stopping the secondary generator 9 and the motor 5, the CPU 147 stops the generator field current control signal 74 to shut off the generator field current 73, waits for a preset time period 76, then stops the motor field current 71. This preset time period 76 is a time period required before the output of the generator reaches a preset level.

Figure 8:
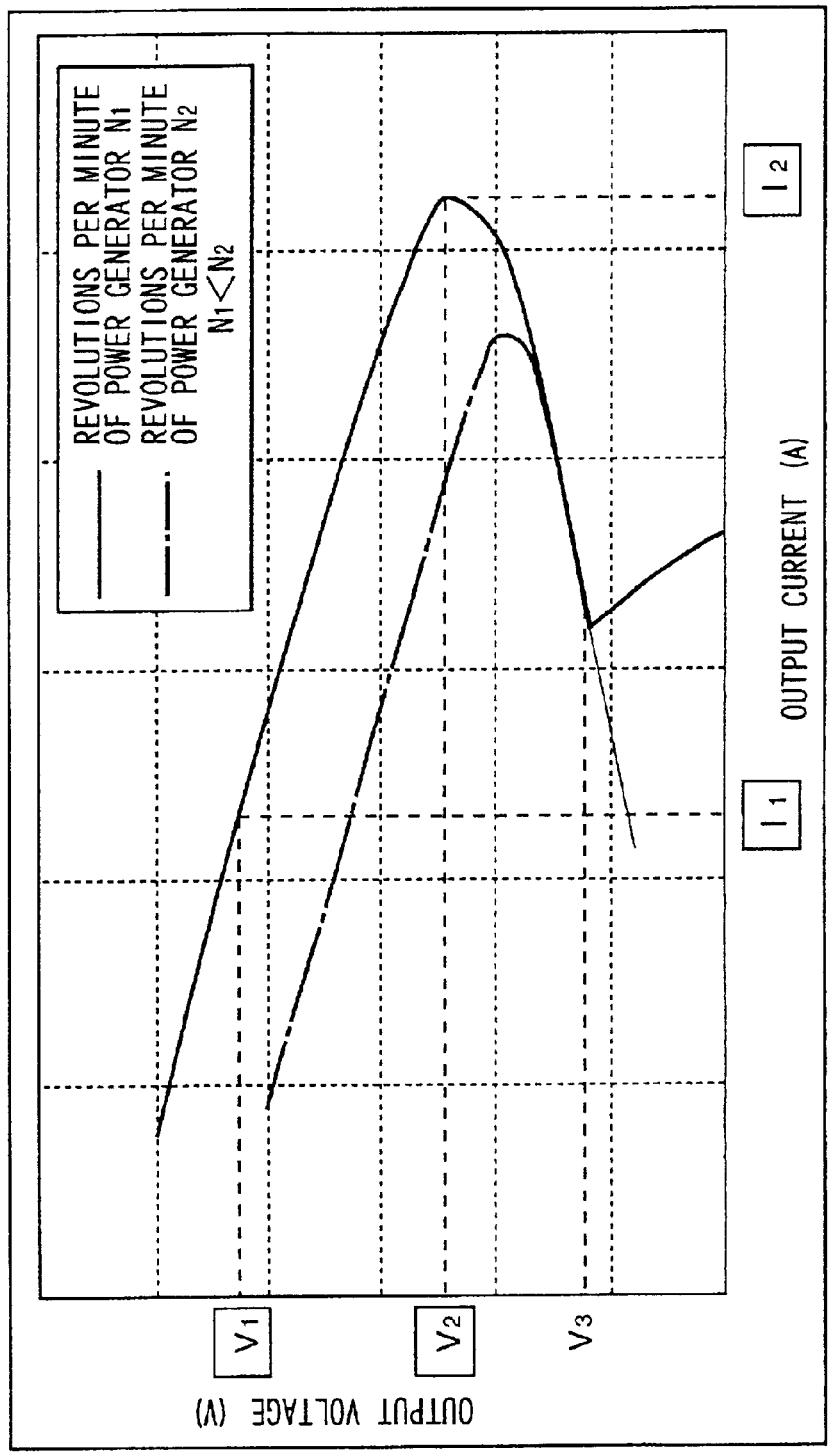
FIG. 8 shows an example of output characteristics of the secondary generator which is one embodiment of the present invention.

FIG. 8 shows an example of output characteristics of the secondary generator in accordance with the present invention. The field winding of the secondary generator 9 is supplied power from both a battery and the secondary generator itself. When the automobile starts or when the secondary generator starts or runs slowly, the field winding of the secondary generator 9 is supplied power from the battery 8 (which is called "separately-excited"). In this case, the characteristics curve in FIG. 8 goes lower left. After the automobile starts, the secondary generator supplies power to its field winding (which is called "self-excited"). The output of the secondary generator is proportional to the number of revolutions of the engine and the output range (both the terminal voltage and the current) expands parabolically. The output voltage V of the secondary generator 9 can be assumed to be an input voltage of the d.c. motor (excluding the wire resistances). Therefore, it is possible to switch the voltage output to the motor 5 in a plurality of steps or continuously in a preset voltage range by controlling the field current of the secondary generator.

Figure 9:
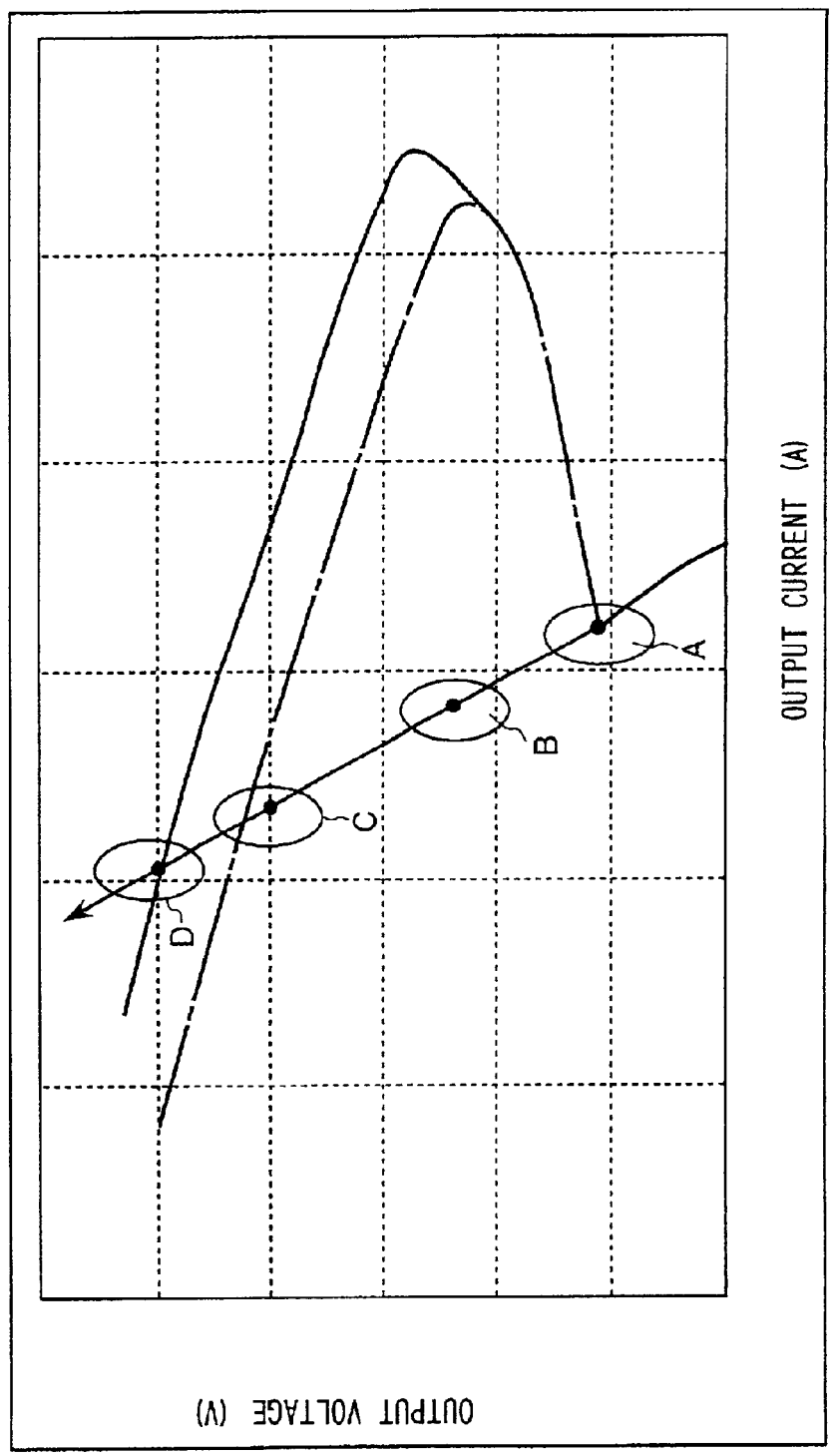
FIG. 9 shows the graph explaining the operation of the secondary generator which is one embodiment of the present invention.

FIG. 9 shows a relationship between the output characteristics of the secondary power generator and the input characteristics of the electric motor 5. The motor 5 requires a high voltage proportional to the rotational speed and the output torque of the motor 5 is proportional to the current. However, the current goes lower as the requested torque reduces from the basic automobile characteristics. In other words, as the automobile requires a great torque at a low speed when starting to move, the generator voltage and current are controlled so that the running point may come into the area A. In this case, the field current value of the motor is set higher so that a high torque may be obtained. As the automobile runs faster, the running point moves through the area B and finally reaches the high-voltage control area C. On a slope, as the driving torque matches with the current when the speed reaches a preset value, the automobile runs by the motor continuously for a preset time period. As the automobile runs faster and the revolutions of the engine increase, the power generator generates more power and a higher voltage can be obtained as shown by the area D. However, the torque reduces in proportion to it. Further, as the voltage must be equal to or less than the maximum voltage, the field current must be reduced to suppress the requested motor voltage.

The areas A, B, C, and D in FIG. 9 respectively indicate the operating areas at the startup of the automobile, while the automobile is running at a low speed, while the automobile is climbing up a slope at a speed of about 20 Km/hour, and while the automobile is running at a speed of about 30 Km/hour in that order.

Referring to FIG. 8 and FIG. 9, when a high torque is required at a low speed, for example when the automobile starts to move or goes out of a rut, the output of the secondary generator 9 is controlled to use an operating area which feeds a power of a high current value and a low voltage value to the d.c. motor 5, that is a point ($V_3$, $I_2$) or point ($V_2$, $I_2$) in FIG. 8 or the operating area A or B in FIG. 9. Similarly, when the automobile runs at a low speed, that is, at a speed of 5 Km/hour to 20 Km/hour, the output of the secondary generator 9 is controlled to use an operating area which feeds a power of a comparatively low current value and a comparatively high voltage value to the d.c. motor 5, that is a point ($V_1$, $I_1$) in FIG. 8 or the operating area C or D in FIG. 9 because some torque is transmitted to the rear wheels and the d.c. motor synchronizes with the revolutions of the rear wheels through the reduction gear.

When a higher power request value is present, the d.c. motor can be driven by a power of a higher output and a lower output by controlling the field currents of the secondary generator and the d.c. motor in the permissible ranges of the secondary generator 9, the d.c. motor 5, and the battery 8. In other words, there are two control methods by provision of two power sources: a method of controlling the field current of the secondary generator 9 and a method of controlling the field current of the d.c. motor. For example, when the electric motor requires low revolutions and a high torque at the start-up of the automobile or the like, the secondary generator 9 is made to output a power of a low voltage and a high current. When the electric motor requires high revolutions and a low torque during steady running, the secondary generator 9 is made to output a power of a high voltage. Further, the revolutions of the electric motor can be increased by reducing the field current of the d.c. motor because this reduces the torque and suppresses increase of the induced voltage. Furthermore, when the front wheels 3 requires higher torques than the rear wheels 4, the field current of the secondary generator 9 is reduced to vary distribution of torques to the front and rear wheels.

As explained above, the present invention combining aforesaid structural characteristics of the electric motor and the generator and a weak field control of the d.c. motor can produce low-voltage torques required to drive wheels under a condition that the output of the generator must be 50 V or less.

Figure 10:
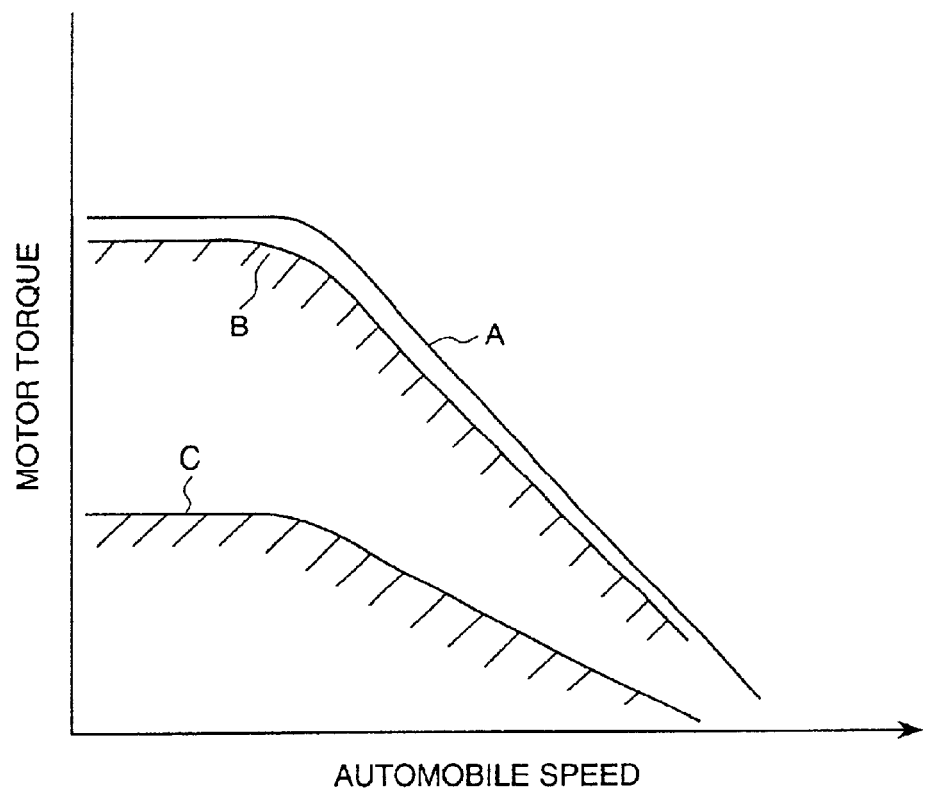
FIG. 10 shows the characteristics of the d.c. motor in one embodiment of the present invention.

FIG. 10 shows a relationship between the motor output torque and the automobile speed. Curves A, B, and C respectively indicate the requested characteristics of the electric motor equivalent to the driving torque of the engine, the output characteristics of the d.c. motor 5 in accordance with the present invention, and the output characteristics of the d.c. motor 5 combined with a conventional charging and starting system in that order. In the conventional charging and starting system having no dedicated generator, the system is connected to a load through a 12-V battery. Therefore, the terminal voltage and the output current are controlled only in the limited low range independently of the revolutions of the engine and the efficiency of power generation of the generator and the input to the driving motor can be given only in this limited range as shown in C of FIG. 10. Contrarily, this embodiment employing a separately-excited method can produce sufficient driving power in a wide range from the startup of the automobile to a high-speed running. Accordingly, the driving motor can be selectively controlled in the wide range shown by B and all 4-wheel drive control modes are selectable.

In accordance with one embodiment of the present invention, the d.c. motor 5 is separated from the engine 2 and controlled independently of the engine 2. In other words, only when the automobile starts to run (at a speed of 0), running slow at a speed under a preset speed (e.g. 20 Km/hour) or moving back, the clutch 11 is coupled to drive the rear wheels. When the automobile speed goes over the preset speed (e.g. 20 Km/hour), the automobile runs only by the engine 2 with the clutch 11 disconnected. In comparison by a driving system in which the engine drives the rear wheels via a propeller shaft, this embodiment requires no transmission means and propeller shaft. This makes the 4-wheel driving mechanism compact and lightweight and consequently increases the fuel efficiency as the rear wheels are disconnected from the front wheels at a speed higher than the preset speed. This embodiment has a high starting acceleration as the startup assistance works from the startup speed (0 Km/hour).

The power line of the clutch 11 is connected to the battery 8 for the auxiliary unit so that the clutch 11 may be connected and disconnected by the controller 14. Therefore, when the 4-wheel drive function is not required, the mechanical connection of the d.c motor 5 and the rear wheels 4 can be broken by force independently of the power generated by the secondary generator 9. For example, when the automobile speed reaches 20 Km/hour, the clutch is disconnected (OFF) and only the front wheels are driven. Therefore, the brushes of the d.c. motor 5 can be less worn out than those in a conventional system whose motor works in the whole speed range. When the clutch 11 is disconnected, the embodiment does not use the d.c. motor. Accordingly, it is possible to switch the secondary generator 9 to use it as a power source for a charging unit and the other auxiliary unit.

In the embodiment of FIG. 2, the field input of the secondary generator 9 contains a diode 32 in the body of the secondary generator 9 and a diode 31 in the regulator 160. The configuration of these diodes 31 and 32 can omit a power block in the control unit 14 and the system can be easily standardized. This configuration also reduces the number of power lines around the secondary generator 9 and enables dispersion of power components in the secondary generator. This increases the efficiency of radiation.

Figure 11:
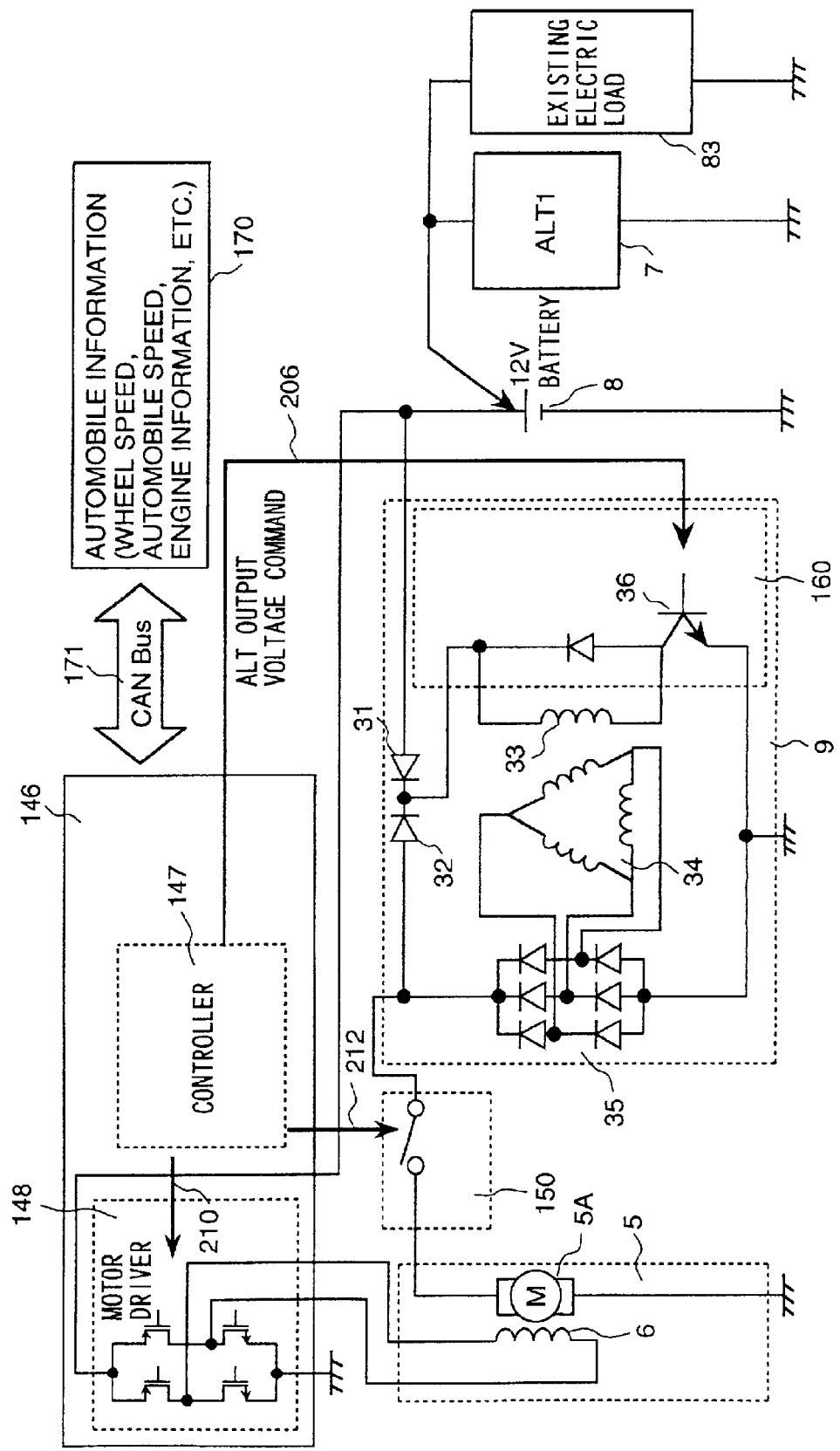
FIG. 11 shows the detailed configuration of the control unit for the generator in another embodiment of the present invention.

FIG. 11 shows the detailed configuration of the control unit 14 for the generator in another embodiment of the present invention. The difference between this second embodiment and the first embodiment is the position of the field input of the secondary generator 9. In other words, the whole field input including diodes 31 and 32 is provided on the secondary generator 9. The configuration of these diodes 31 and 32 can omit a power block in the control unit 14 and the system can be easily standardized. This configuration also reduces the number of power lines around the secondary generator 9.

It is also possible to provide the whole field input of the secondary generator 9 including diodes 31 and 32 in the control unit 14. This field input configuration can standardize and simplify the circuit of the secondary generator 9.

Similarly, it is possible to provide the whole field input of the secondary generator 9 in the regulator 160. This field input configuration omits the power block in the control unit 14 and can standardize the circuit. This configuration reduces the number of power lines around the secondary generator 9 and enables standardization of the circuit of the secondary generator 9.

Figure 12:
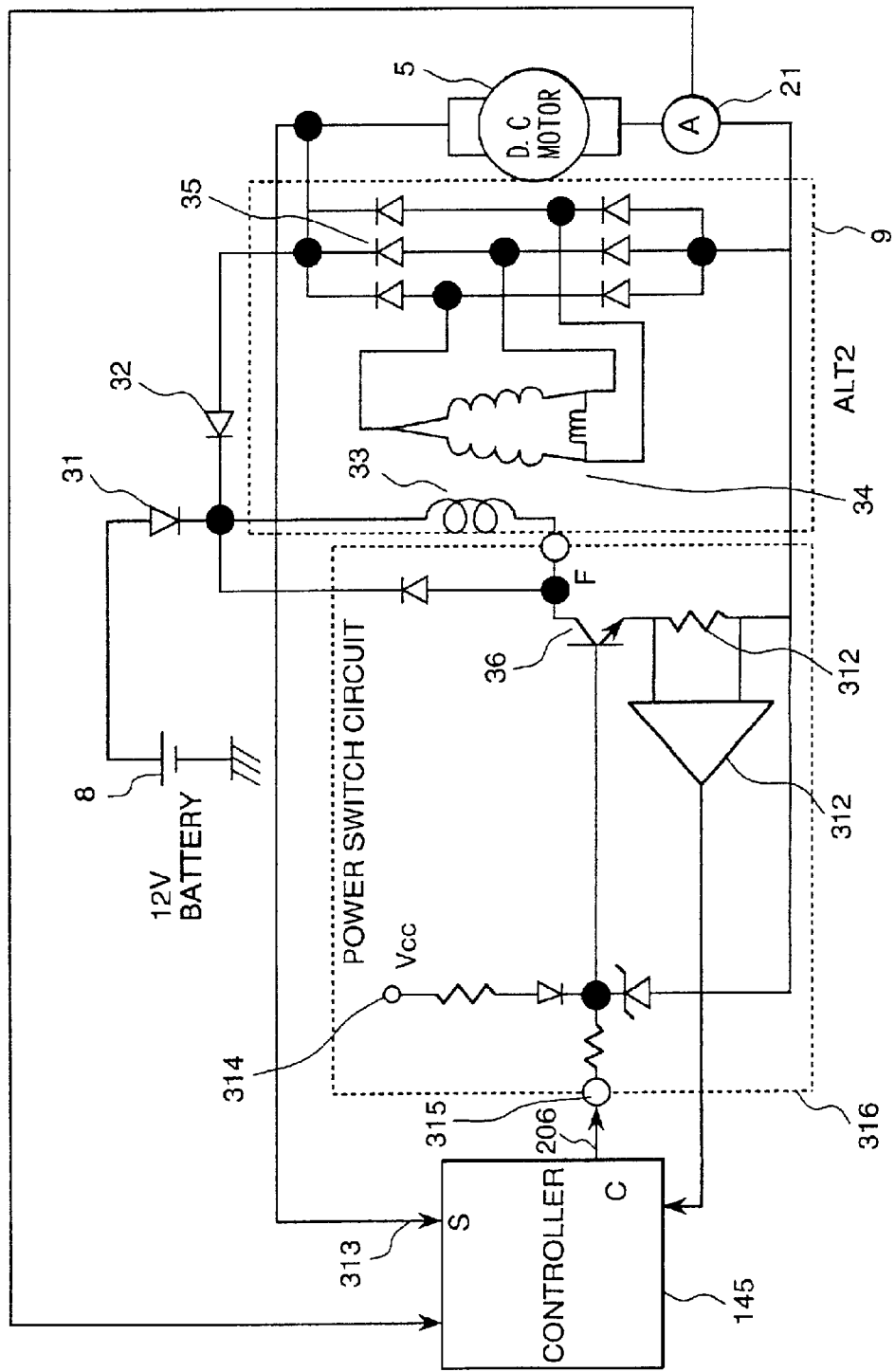
FIG. 12 shows a detailed configuration of the control unit of the generator which is one embodiment of the present invention.

FIG. 12 shows a detailed configuration of the control unit 14 of the generator in accordance with the present invention, that is, the configuration of a power system comprising the regulator 316 and the controller 145 of the motor control unit.

The output of the secondary generator 9 is determined by the number of revolutions of the engine which is linked by a driving source and a current flowing through the field coil 33 and power induced on the stator 34 is supplied to an electric motor (e.g. a d.c. motor) which is a load through rectifying diodes 35.

In general, there are two ways of stator connection: Star connection (as in this embodiment) and Delta connection and any one of the connections can be used. However, experimentally, a delta connection is preferential because it can be controlled up to a high-voltage high-output with less ripples.

The controller 145 detects, on the S terminal 313, the output voltage of the generator to be directly controlled or a voltage applied to the d.c. motor which is a load, compares it by a requested command voltage, and determines the ON time of the transistor 36 for controlling the field current. The controller 145 directly controls the transistor 36 for controlling the field current to quickly vary from a low voltage close to 0 V to a high voltage. However, to control the output of the secondary generator 9 more quickly or to control the driving torque more accurately, a direct current feedback control is preferable. The current of the secondary generator is also used to be fed to the armature of the d.c. motor 5 and to control the field current. Current control independently of the current type has quicker responses than voltage control. However, the current control is not steady and the control mode is switched between the voltage control mode and the current control mode according to the running condition.

Figure 13:
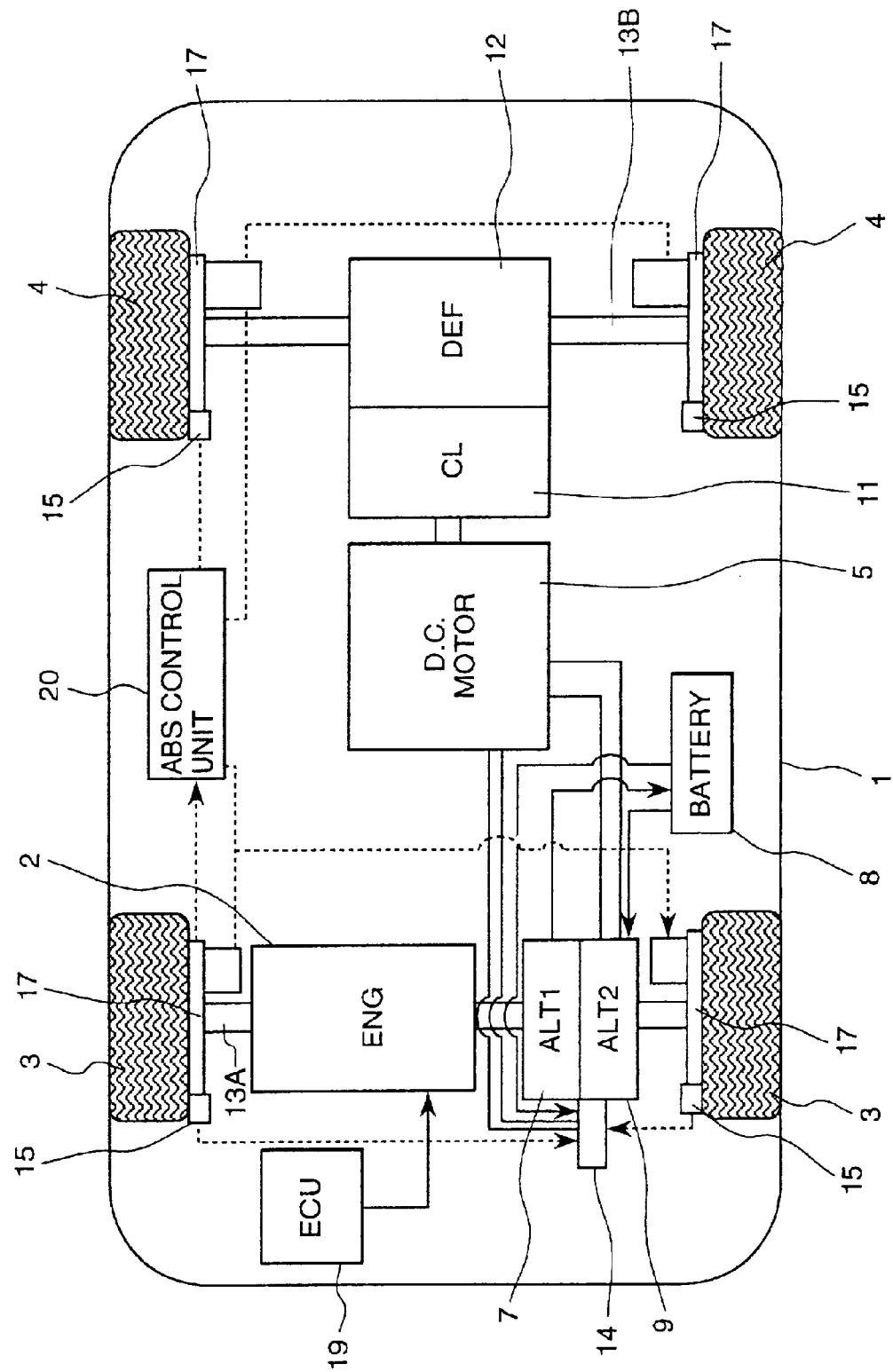
FIG. 13 is a block diagram of a whole 4-wheel drive automobile which is another embodiment of the present invention.
Figure 14:
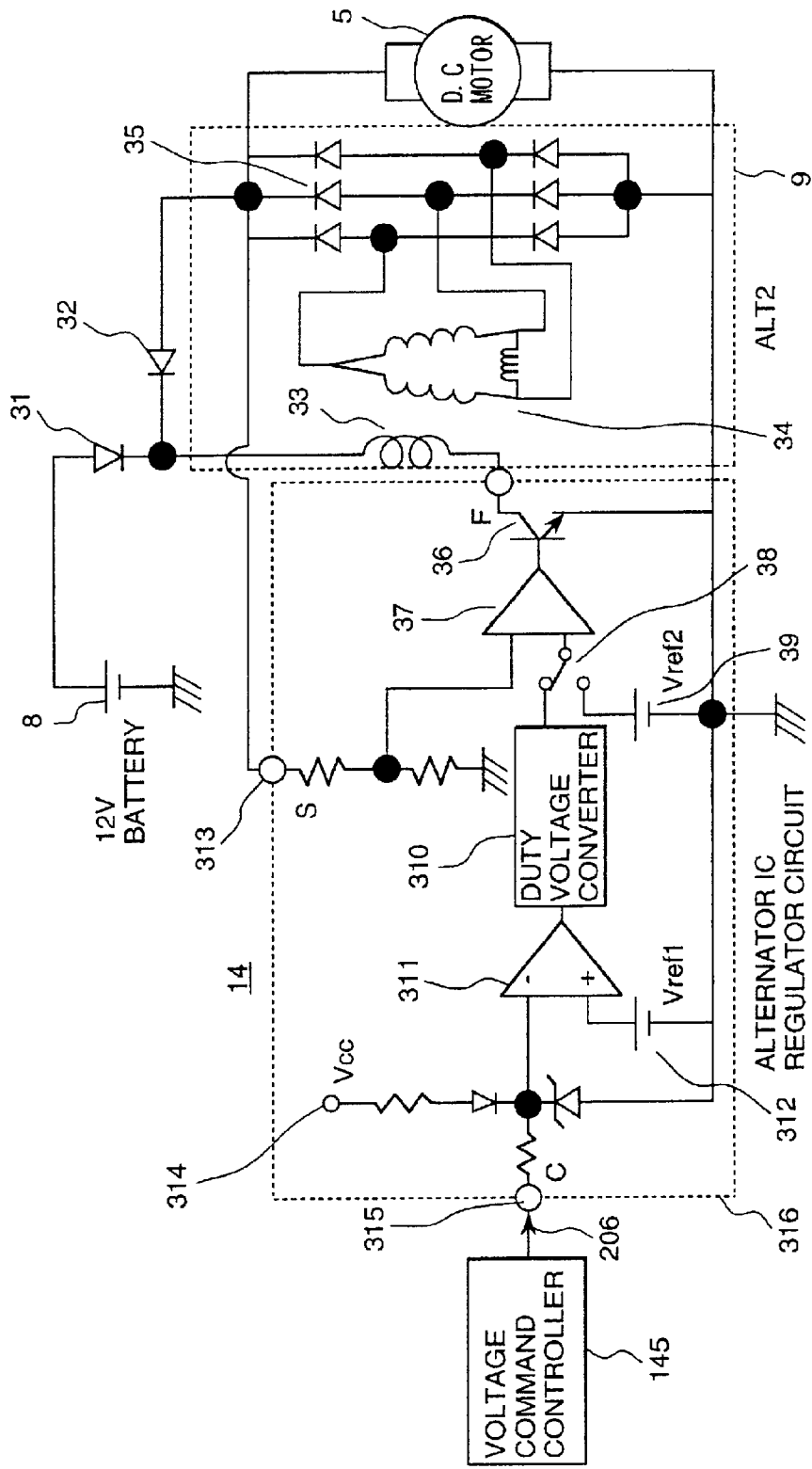
FIG. 14 shows the detailed configuration of the control unit of the secondary generator 9 of FIG. 13.

FIG. 13 is a block diagram of a whole 4-wheel drive automobile which is another embodiment of the present invention. FIG. 14 shows the detailed configuration of the control unit of the secondary generator 9 of FIG. 13. The generator control system of this embodiment consists of a controller 14 and a regulator mounted in a unit on the secondary generator 9.

Referring to FIG. 13, the controller 14 having a microcomputer is mounted in a unit on the secondary generator 9. The microprocessor (microcomputer) of the controller 14 receives signals from the automobile speed sensor and the accelerator-opening sensor and produces various signals (output of the secondary generator 9, field current value of the d.c. motor 5, and on/off signal of the clutch 11). The part 20 is an anti-lock brake (ABS) control unit. The other components of this embodiment are the same as those of the first embodiment (see FIG. 1). Their explanation is omitted here.

Referring to FIG. 14, the output of the secondary generator 9 is determined by the number of revolutions of the engine which is linked by a driving source and a current flowing through the field coil 33 and power induced on the stator 34 is supplied to an electric motor (e.g. a d.c. motor) which is a load through rectifying diodes 35.

The regulator 316 detects the output voltage of the generator on the S terminal 313, compares it by a requested command voltage, and determines the ON time of the transistor 36 for controlling the field current. When receiving an on/off duty command value from an external control unit 14, the regulator 316 compares it by the reference voltage 312 in the comparator 311, shapes the waveform, converts it into a voltage command by the duty-voltage converter 310, and feeds it as a reference voltage to the comparator 37 through the change-over switch 38.

Figure 15:
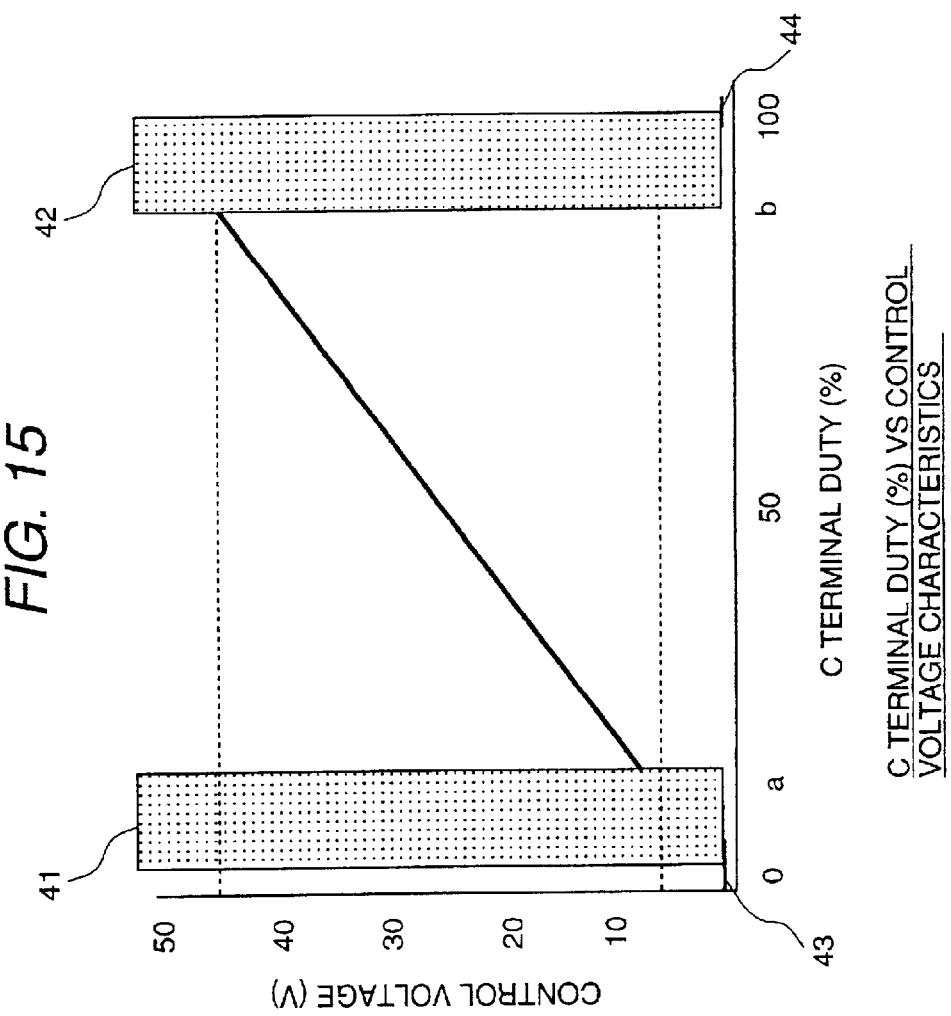
FIG. 15 shows the relationship between control voltages and duty values sent from the external control unit of FIG. 5.

FIG. 15 shows the relationship between duty values and control voltages of the embodiment of FIG. 14. As seen in FIG. 14, the control range between the lower blind sector 41 and the upper blind sector 42 can vary voltage from a low-voltage area under 12 V and a high-voltage area above 42 V in proportion to the duty value. When no control signal comes or when the on/off signal has an ON or OFF status which is continuous for a preset time period or longer, the change-over switch 38 is switched to Vref2 (39).

In this control system, when the load is the electric motor only, the output voltage of the generator is set to almost 0 V to suppress excessive torque for safety. This is represented by 43 (in the lower limit side) and 44 (in the upper limit side) in FIG. 15.

The field current is supplied from both the 14-V battery and the generator (alternator) 9 which are OR-connected by diodes. This enables field current supply from the battery when the generator runs too slowly to generate power or when the control command value falls under a battery voltage. As the result, the control response is improved. When the output of the generator 9 is equal to or greater than the battery voltage, the field current is supplied from the generator 9 itself and increased, enabling generation of a high output.

The positions of the controller 14 and the regulator are not limited to the positions shown in FIG. 1 and FIG. 13. The controller 14 and the regulator can be placed for example in the engine room, more particularly near the d.c. motor 5.

Figure 16:
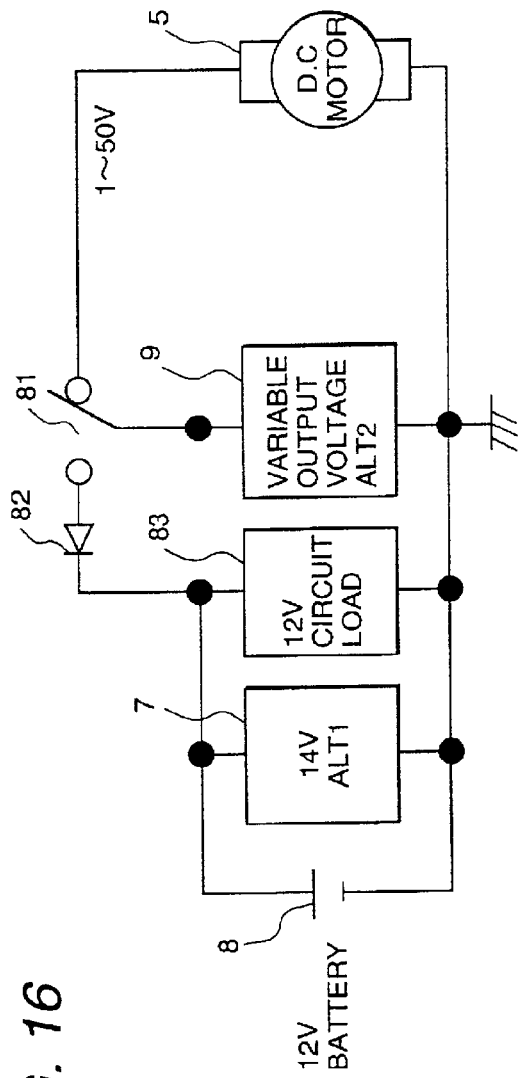
FIG. 16 shows how the 14-V primary generator 7 and the variable-output-voltage secondary generator 9 used as a power source of the driving motor distribute power to the electric load of the automobile.
Figure 17:
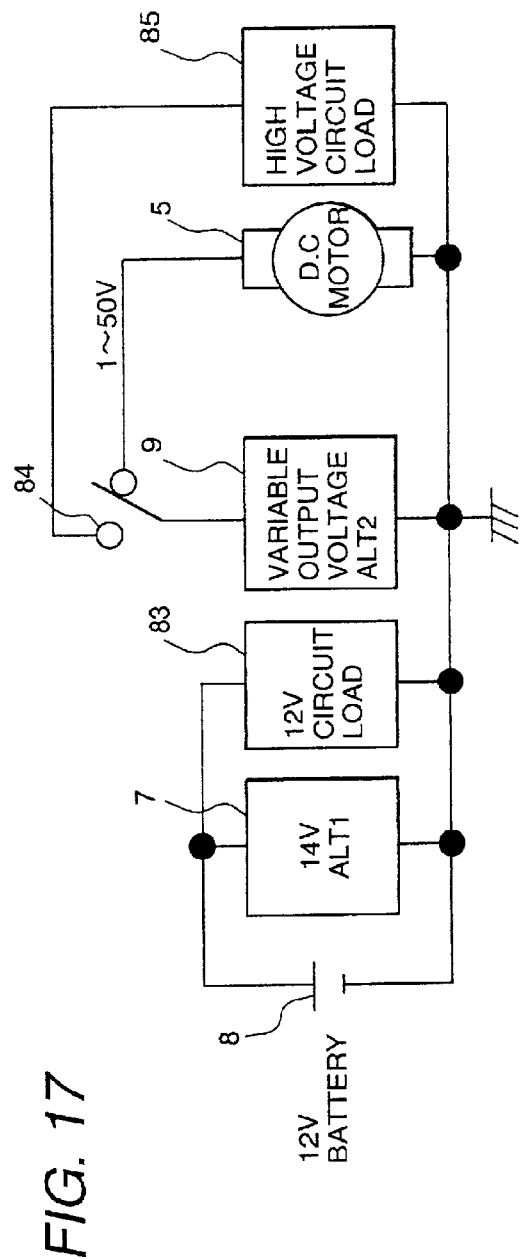
FIG. 17 shows how the 14-V primary generator 7 and the variable-output-voltage secondary generator 9 used as a power source of the driving motor distribute power to the electric load of the automobile.
Figure 18:
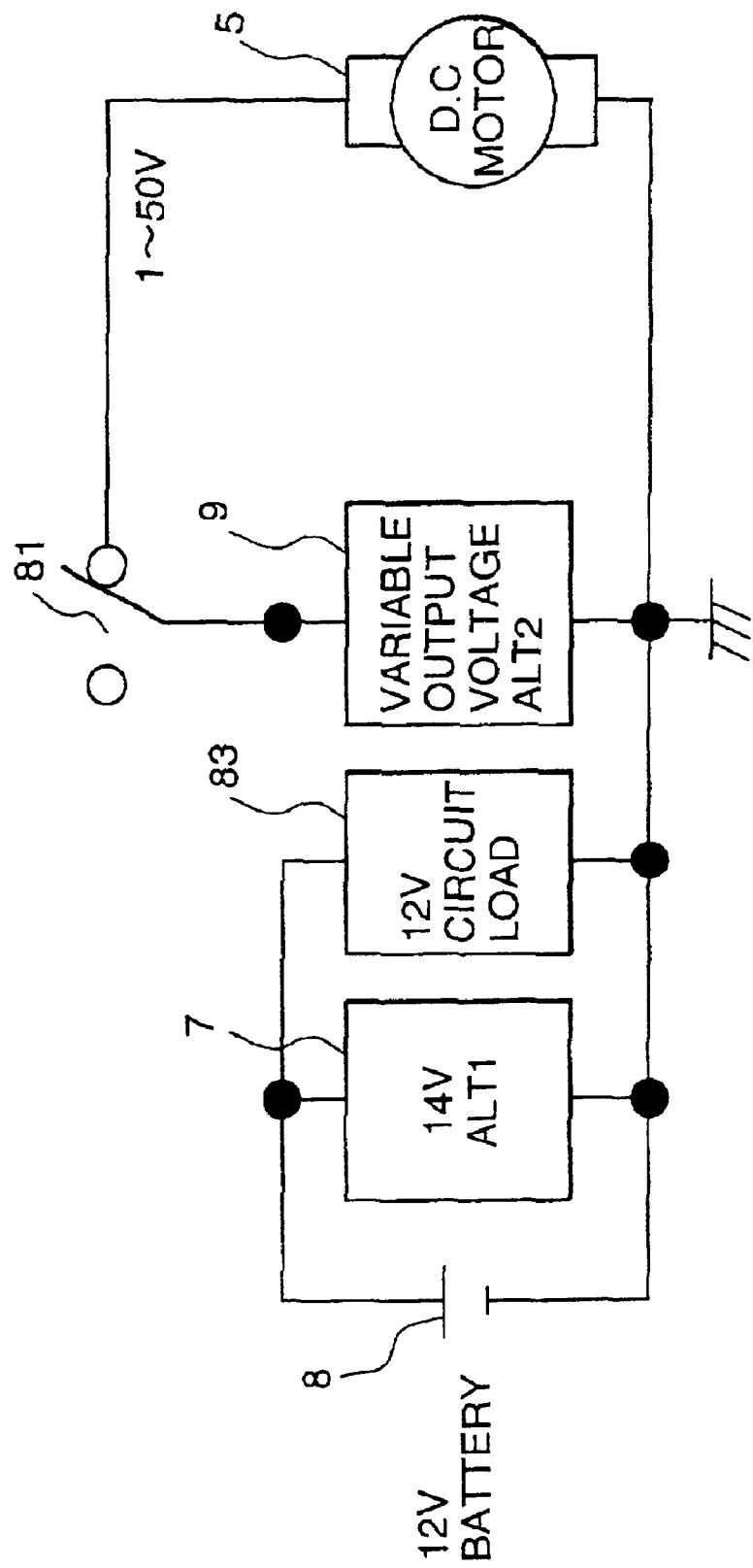
FIG. 18 shows how the 14-V primary generator 7 and the variable-output-voltage secondary generator 9 used as a power source of the driving motor distribute power to the electric load of the automobile.

FIG. 16 to FIG. 18 shows how the 14-V primary generator 7 and the variable-output-voltage secondary generator 9 used as a power source of the driving motor 5 distribute power to the electric load of the automobile.

Referring to FIG. 16, the secondary generator 9 is a dedicated generator independent of a set of the 14-V electric load 83 and the primary generator 7 which supplies power to the battery 8. When power is not supplied to the motor 5, the output of the secondary generator 9 is switched to the 14-V electric load 83 by means of the switch 81 and the diode 82. To prevent a current feedback, the diode 82 is inserted to a line which supplies a power from the secondary generator 9 to the 14-V electric load 83.

This switching to the 14-V electric load 83 by the switch 81 when power is not supplied to the motor 5 is made by making the control voltage of the secondary generator 9 lower or higher than the voltage of the generator 7 which supplies power to the 14-V electric load 83 according to the quantity of the electric load and selecting one of said generators which has higher generation efficiency or which satisfies the current condition. For example, when the output voltage of the secondary generator 9 is made lower than the voltage of the generator 7 which supplies power to the 14-V electric load, he feedback control of the voltage regulator of the generator exerts only on the primary generator and the secondary generator 9 stops power generation.

In FIG. 17, the secondary generator 9 is provided independently of a set of the 14-V low-voltage electric load 83 and the generator 7 which supplies power to the battery 8. When power is not supplied to the motor 5, the output of the secondary generator is switched, by the switch 84, to the electric load 85 of the automobile which requires a high-voltage high power for Quick Clear and EHC which hardly causes a problem even when a power supply is temporarily shut off at the startup of the automobile.

In FIG. 18, the generator 9 is a dedicated generator (secondary generator) independent of a set of the 14-V electric load 73 and the primary generator 7 which supplies power to the battery 8. When power is not supplied to the motor 5 which drives the wheels, only the self-excited component of the generated power is made minimum. For this purpose, the current to the field winding of the secondary generator 9 is suppressed. In this case, if the motor 5 is not driven by the self-excited component of the generated power, it is normal. If the motor may possibly be driven such a power component, the secondary generator must be disconnected by the switch 81 so that the secondary generator 9 may not be damaged by such a self-excited power component.

In accordance with the present invention, a dedicated generator, that is a secondary generator directly drives an electric motor for driving wheels. In other words, the driving force of the electric motor is controlled by the output of the secondary generator. This assures a sufficient driving force. Therefore, the present invention provides an electric generating system for automobiles and a method thereof which assures a sufficient 4-wheel drive performance (not inferior to the mechanical 4-wheel drive performance) in a wide driving range from the startup of the automobile to climbing up a slope at a high speed.

Further, the electric generating system for automobiles and a method thereof in accordance with the present invention also have original 4-wheel drive merits (such as no propeller shaft, flat vehicle floor) and require no high-voltage battery. This can reduce the production cost of the automobile, place the generator anywhere in the automobile, and eliminate maintenance and replacement of a high-voltage battery. Therefore the driving system can be simple, high efficient, and with high performance.

What we claim is:

1. An electric generating system for automobiles comprising a primary generator which is driven by an internal combustion engine of an automobile and supplies power to an electric load of said automobile and an electric motor which drives wheels of said automobile which are not driven by said internal combustion engine; further comprising a secondary generator which is driven by said internal combustion engine and a control unit which controls said secondary generator and said electric motor;

wherein
said control unit controls the output of said secondary generator according to a driving force requested by said automobile and
said electric motor has its driving force controlled by the output of said secondary generator, wherein a field winding of said generator has two power supply sources and can switch a voltage sent from said secondary generator to said electric motor in a plurality of steps or in a present voltage range.

2. An electric generating system for automobiles, comprising a primary generator which is driven by an internal combustion engine of an automobile and charges a battery on said automobile and an electric motor which drives wheels of said automobile which are not driven by said internal combustion engine;

a secondary generator which is driven by said internal combustion engine;
a control unit which controls said secondary generator and said electric motor; and
a battery charging circuit operatively associated with said battery,
wherein
said secondary generator is separated from said battery charging circuit and supplies output power thereof directly to said electric motor, and said control circuit controls the output of said generator according to a driving force requested by said automobile and controls the driving force of said electric motor by a voltage or current supplied from said secondary generator, wherein a field winding of said secondary generator inputs power from both said battery and said secondary generator and said two power sources are connected in an OR manner with diodes.

3. An electric generating system for automobiles in accordance with claim 2, wherein said control unit of said secondary generator inputs a signal from said external control unit, checks the ON:OFF duty ratio of said signal and provides a blind sector in a time period containing a continuous ON or OFF time period longer than a present time period.

4. An electric generating system for automobiles comprising a primary generator which is driven by an internal combustion engine of an automobile and supplies power to an electric load of said automobile and an electric motor which drives wheels of said automobile which are not driven by said internal combustion engine; further comprising a secondary generator which is driven by said internal combustion engine and a control unit which controls said secondary generator and said electric motor, wherein said control unit contains an external control unit except for a control unit of said secondary generator and wherein said control unit of said secondary generator inputs a command control value of said secondary generator from said secondary external controller and stops power generation when detecting that the signal from said external control unit is abnormal.

5. An electric generating system for automobiles comprising a primary generator which is driven by an internal combustion engine of an automobile and supplies power to an electric load of said automobile and an electric motor which drives wheels of said automobile which are not driven by said internal combustion engine; further comprising a secondary generator which is driven by said internal combustion engine and a control unit which controls said secondary generator and said electric motor, wherein the output end of said secondary generator is connected to said electric motor through a change-over switch and said control unit works to minimize only power generation by said secondary generator when no output is supplied to said electric motor.

6. An electric generating system for automobiles in accordance with claim 5, wherein a said control unit switches the output to a normal automobile electric load when no output is supplied to said electric motor, controls the control voltage of said secondary generator lower or higher than the voltage of said primary generator according to the quantity of said automobile electric load, and determines to supply power from either of said primary and secondary generators.

7. An electric generating system for automobiles in accordance with claim 5, wherein said control unit switches its output to the high-voltage automobile electric load when said secondary generator is not supplying power to said electric motor.

8. An electric generating system for automobiles comprising a primary generator which is driven by an internal combustion engine of an automobile and supplies power to an electric load of said automobile and an electric motor which drives wheels of said automobile which are not driven by said internal combustion engine, further comprising
a secondary generator which is driven by said internal combustion engine and
a control unit which controls said secondary generator and said electric motor;

wherein
said secondary generator is constituted to supply power to said electric motor and
said control unit contains an external control unit except for a control unit of said secondary generator, and causes said external control unit to output a field current on/off signal as a command to control said secondary generator, and thus sets an arbitrary output voltage or current of said secondary generator.

9. An electric generating system for automobiles in accordance with claim 8; wherein said external control unit switches between a voltage feedback control and a current feedback control as an output request value of said secondary generator which is determined according to a request and the status of said automobile and said electric motor.

10. An electric generating system for automobiles in accordance with claim 8, wherein said external control unit controls to first feed a current to the field winding of said electric motor and then feed the armature current which is the output of the generator after a present time period and at the start of power generation when feeding a power from said secondary generator to said electric motor.

11. An electric generating system for automobiles in accordance with claim 8, wherein said external control unit controls to first stop said secondary generator and then shut off the armature current which is the output of the secondary generator when shutting off a power from said secondary generator to said electric motor.

12. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;
an electric motor for generating said driving force;
a secondary generator driven by said internal combustion engine; and a control unit for controlling said electric motor and said secondary generator; wherein
said control unit controls an output of said secondary generator according to a driving force requested by said automobile;
said electric motor generates said driving force by receiving said output of said secondary generator;
said generated driving force is adjusted by said controlled output of said secondary generator; and
an output voltage supplied to said electric motor from said secondary generator is switched in plural steps.

13. An electric generating system for automobiles in accordance with claim 12, wherein said secondary generator and said electric motor have an operative connection which excludes a battery.

14. An electric generating system for an automobile according to claim 12, wherein said control unit is operative to control
said output voltage of said secondary generator in a range of 1 V to 50V.

15. An electric generating system for an automobile according to claim 12, wherein
a current supply source to a field winding of said secondary generator is constituted by two systems.

16. An electric generating system for an automobile according to claim 12, wherein
said control unit includes an external control unit, except for a control unit of said secondary generator; and said control unit of said secondary generator operative to input a control command value of said secondary generator from said external control unit judges an abnormality.

17. An electric generating system for an automobile according to claim 12, wherein an output end of said secondary generator is connected to said electric motor through a change-over switch; and in the absence of an output of said secondary generator to said electric motor, said control unit works to minimize only an electric power generation quantity of said secondary generator to have a self-excitation part.

18. An electric generating system for an automobile according to claim 16, wherein said control unit of said secondary generator is configured to judge an input signal from said external control unit with an ON:OFF duty ratio;

when an ON or OFF having more than preset period time becomes continuous, said control unit of said secondary generator judges an abnormality; and a blind sector is provided in said abnormal judging time period.

19. An electric generating system for an automobile according to claim 17, wherein in the absence of an output of said secondary generator to said electric motor, said control unit switches an output supply part to a normal automobile electric load;

said control unit controls a control voltage at a side of said secondary generator to make the control voltage lower or higher than a voltage at a side of said primary generator according to a quantity of said automobile electric load; and said control unit decides to supply said electric power from said primary generator or said secondary generator.

20. An electric generating system for an automobile according to claim 17, wherein in the absence of an output of said secondary generator to said electric motor, said control unit switches to supply said output to a high-voltage system automobile electric load.

21. An electric generating system for an automobile mounted on said automobile, in which either of front wheels and rear wheels of said automobile is driven by an internal combustion engine, which drives a primary generator for supplying an electric power to a low-voltage electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is configured to supply an output having a voltage in a range from a lower voltage to a higher voltage compared with a low-voltage system voltage to said electric motor;

said control unit controls an output of said secondary generator according to a driving force requested by said automobile;

said electric motor generates said driving force by receiving said output of said secondary generator;

said generated driving force is adjusted by said output of said secondary generator; and an output voltage supplied to said electric motor from said secondary generator is switched in plural steps.

22. An electric generating system for automobiles in accordance with claim 21, wherein said secondary generator and said electric motor have an operative connection which excludes a battery.

23. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is separated from said automobile-mounted batter and an electric generation output is configured to supply directly to said electric motor;

said control unit controls an output of said secondary generator according to a driving force requested by said automobile;

said electric motor generates said driving force by receiving said output of said secondary generator;

said generated driving force is adjusted by said output of said secondary generator; and an output voltage supplied to said electric motor from said secondary generator is switched in plural steps.

24. An electric generating system for automobiles in accordance with claim 23, wherein said secondary generator and said electric motor have an operative connection which excludes battery.

25. An electric generating system for an automobile according to claim 23, wherein a current supply source to a field winding of said secondary generator is constituted by a battery charged by said primary generator of said secondary generator itself; and said current supply source is OR-connected using a diode.

26. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is configured to supply an output having a voltage in a range from a lower voltage to a higher voltage;

said control unit controls an output of said secondary generator according to a driving force requested by said automobile;

said electric motor generates said driving force by receiving said output of said secondary generator;

said generated driving force is adjusted by said output of said secondary generator; and an output voltage supplied to said electric motor from said secondary generator is switched in a plural steps.

27. An electric generating system for automobiles in accordance with claim 26, wherein said secondary generator and said electric motor have an operative connection which excludes a battery.

28. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is configured to supply an electric power generation output to said electric motor;

said control unit includes an external control unit, except for a control unit of said secondary generator;

said control unit output is an ON/OFF signal of a field current of said secondary generator as a control signal of said secondary generator from said external control unit to said control unit haven said secondary generator; and said control unit is configured to set freely an output voltage or an output current of said secondary generator.

29. An electric generating system for an automobile according to claim 28, wherein said external control unit is configured to output by switching freely between a voltage feedback control and a current feedback control as an output request value of said secondary generator, which is determined according to a status and a request of said automobile and said electric motor.

30. An electric generating system for an automobile according to claim 28, wherein said external control unit is configured to control an electric power supply to said electric motor from said secondary generator to flow an armature current which is said output of said secondary generator to said electric motor, a the same time of starting electric power generation of said second generation from a preset time lapse after feeding of field current to said electric motor.

31. An electric generating system for an automobile according to claim 28, wherein said external control unit is configured to control an electric power supply to said electric motor from said secondary generator by stopping said secondary generator and, after a present time lapse, to shut off a supply of an armature current being said output of said secondary generator to said electric motor.

32. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said control unit controls an output of said secondary generator according to a driving force requested by said automobile;

said electric motor generates said driving force by receiving said output of said secondary generator; and an output voltage supplied to said electric motor from said secondary generator is continuously variable in a preset voltage range.

33. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is configured to enable supply an output having a voltage range from a lower voltage to a higher voltage compared with a low-voltage system voltage to said electric motor;

said control unit adjusts said driving force generated by said electric motor according to said output of said secondary generator; and an output voltage supplied to said electric motor from said secondary generator is continuously variable in a preset voltage range;

said control unit controls an output of said secondary generator according to a driving force requested by said automobile;

said electric motor generates said driving force by receiving said output of said secondary generator;

said control unit adjusts said driving force generated by said electric motor according to said output of said secondary generator; and an output voltage supplied to said electric motor from said secondary generator is continuously variable in a preset voltage range.

34. An electric generating system for an automobile mounted on said automobile, in which either of front wheels and rear wheels of said automobile is driven by an internal combustion engine, which drives a primary generator for supplying an electric power to a low-voltage electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is separated from said automobile-mounted battery and an electric power generation output is configured to supply directly to said electric motor;

said electric motor generates said driving force by receiving said output of said secondary generator;

said driving force generated from said electric motor is adjusted according to said output supplied from said secondary generator; and said control unit controls an output of said secondary generator according to a driving force requested by said automobile;

said driving force generated from said electric motor is adjusted according to said output supplied from said secondary generator; and an output voltage supplied to said electric motor from said secondary generator is continuously variable in a preset voltage area.

35. An electric generating system for an automobile mounted on said automobile, in which either of front wheels and rear wheels of said automobile is driven by an internal combustion engine, which drives a primary generator for supplying an electric power to an electric load of said automobile, and other wheels, which differs from said wheels driven by said internal combustion engine, are driven by a driving force, comprising;

an electric motor for generating said driving force;

a secondary generator driven by said internal combustion engine; and a control unit for controlling said electric motor and said secondary generator; wherein said secondary generator is configured to supply an output having a voltage range from a lower voltage to a higher voltage compared with a low-voltage system voltage to said electric motor;

said electric motor generates said driving force by receiving said output of said secondary generator;

said control unit controls an output of said secondary generator according to a driving force requested by said automobile;

said generated driving force generated from said electric motor is adjusted according to said output of said secondary generator; and an output voltage supplied to said electric motor from said secondary generator is continuously variable in a preset voltage area.

36. A method of controlling an electric generating system for an automobile, having a secondary generator which is driven according to a primary generator for supplying an electric power to an electric load of said automobile, and an internal combustion engine for driving either of front wheels and rear wheels of said automobile, said electric power being used to generate a driving a force by driving an electric motor, for driving wheels, other than the wheels driven by said internal combustion engine, comprising inputting a control signal of said secondary generator according to an operation condition of said automobile as an ON/OFF signal of a field current of said secondary generator, and controlling an operation of said secondary generator;

outputting said electric power obtained by said operation of said secondary generator, and controlling said driving force outputted from said electric motor according to said electric power outputted from said secondary generator; and continuously varying an output voltage of said secondary generator in a preset voltage range, when said electric power output to said electric motor from said secondary generator.

37. A method of controlling an electric generating system for an automobile, having a secondary generator which is driven according to a primary generator for supplying an electric power to an electric load of said automobile, and an internal combustion engine for driving either of front wheels and rear wheels of said automobile, according to said obtained electric power by generating a driving force by driving an electric motor and according to said driving force by driving other wheels, which differs from said wheels driven by said internal combustion engine, comprising inputting a control signal of said secondary generator according to an operation condition of said automobile as an ON/OFF signal of a field current of said secondary generator and controlling an operation of said secondary generator;

outputting said electric power obtained by operation of said secondary generator and controlling said driving force outputted from said electric motor according to said outputted electric power of said secondary generator; and switching an output voltage of said secondary generator in plural stages, when said electric power output to said electric motor from said secondary generator.

38. A method of controlling electric generating systems for automobiles in accordance with claim 37, wherein said secondary generator and said electric motor have an operative connection which excludes a battery.

39. A method of controlling electric generating systems for automobiles in accordance with claim 37, wherein said secondary generator and said electric motor have an operative connection which excludes a battery.

40. A method of controlling an electric generating system for an automobile, having a secondary generator which is driven according to a primary generator for charging an automobile-mounted battery, and an internal combustion engine for driving either of front wheels and rear wheels of said automobile, according to said obtained electric power by generating a driving force by driving an electric motor, and according to said driving force by driving other wheels, which differs from said wheels driven by said internal combustion engine, comprising making a supply source of a field current of an automobile-mounted battery at a starting time of said automobile, and inputting said field current to said secondary generator from said automobile-mounted battery according to an operation status of said automobile, and controlling an operation of said secondary generator;

making a supply source of a field current of said secondary generator itself at a running time of said automobile, inputting said field current to said secondary generator from said secondary generator itself according to an operation status of said automobile, and controlling an operation of said secondary generator;

outputting said electric power obtained according to said operation of said secondary generator, and controlling said driving force outputted from said electric motor according to said outputted electric power of said secondary generator; and switching an output voltage of said secondary generator in plural stages, when said electric power output to said electric motor from said secondary generator.

41. A method of controlling an electric generating system for an automobile, having a secondary generator which is driven according to a primary generator for supplying an electric power to an electric load of said automobile, and an internal combustion engine for driving either of front wheels and rear wheels of said automobile, said electric power being used to generate a driving a force by driving an electric motor, for driving wheels, other than the wheels driven by said internal combustion engine, comprising making a supply source of a field current of an automobile-mounted battery at a starting time of said automobile, inputting said field current to said secondary generator from said automobile-mounted battery according to an operation status of said automobile, and controlling an operation of said secondary generator;

making a supply source of a field current of said secondary generator itself at a running time of said automobile, inputting said field current to said secondary generator from said secondary generator itself according to an operation status of said automobile, and controlling an operation of said secondary generator;

outputting said electric power obtained according to said operation of said secondary generator, and controlling said driving force outputted from said electric motor according to said outputted electric power of said secondary generator; and switching an output voltage of said secondary generator in plural stages, when said electric power output to said electric motor from said secondary generator.

* * * * *